United States Patent
Nakata et al.

(10) Patent No.: US 7,112,290 B2
(45) Date of Patent: Sep. 26, 2006

(54) LIQUID CRYSTAL COMPOSITION AND LIQUID CRYSTAL DISPLAY ELEMENT

(75) Inventors: Hidetoshi Nakata, Ageo (JP); Kiyofumi Takeuchi, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 102 days.

(21) Appl. No.: 10/678,256

(22) Filed: Oct. 6, 2003

(65) Prior Publication Data

US 2004/0076769 A1    Apr. 22, 2004

(30) Foreign Application Priority Data

Oct. 9, 2002  (JP)  ............... 2002-295501
Feb. 26, 2003 (JP)  ............... 2003-049060

(51) Int. Cl.
  *C09K 19/52* (2006.01)
(52) U.S. Cl. ............... 252/299.01; 252/299.7; 428/1.1
(58) Field of Classification Search ........... 252/299.01, 252/299.5, 299.7; 428/1.1
  See application file for complete search history.

(56) References Cited

U.S. PATENT DOCUMENTS

| 4,264,148 A |   | 4/1981 | Göbl-Wunsch et al. |          |
|-------------|---|--------|--------------------|----------|
| 4,988,458 A | * | 1/1991 | Heppke et al.      | 252/299.63 |
| 5,858,271 A |   | 1/1999 | Sekiguchi et al.   |          |

FOREIGN PATENT DOCUMENTS

| JP | 55-38869  |   | 3/1980  |
|----|-----------|---|---------|
| JP | 63-51359  |   | 3/1988  |
| JP | 5-281525  | * | 10/1993 |
| JP | 6-265899  |   | 9/1994  |
| JP | 7-258641  |   | 10/1995 |
| JP | 9-317062  | * | 8/1997  |
| JP | 11-305187 |   | 11/1999 |
| JP | 11-323338 |   | 11/1999 |
| WO | WO97/29167 |  | 8/1997  |

OTHER PUBLICATIONS

English abstract for JP 5-281525, 1993.*
English abstract for JP 9-217062, 1997.*

* cited by examiner

*Primary Examiner*—Shean C. Wu
(74) *Attorney, Agent, or Firm*—Armstrong, Kratz, Quintos, Hanson & Brooks, LLP

(57) ABSTRACT

A chiral nematic liquid crystal composition has minimal temperature dependency of the natural pitch and temperature dependency of the wavelength selective reflection and low temperature storage stability thereof is excellent. A chiral nematic liquid crystal composition with a broad liquid crystal temperature range is used in a bistable liquid crystal display element, and a bistable liquid crystal display element comprising the liquid crystal composition. The chiral nematic liquid crystal composition comprises optically active compounds represented by general formula (I-a) and general formula (II-a):

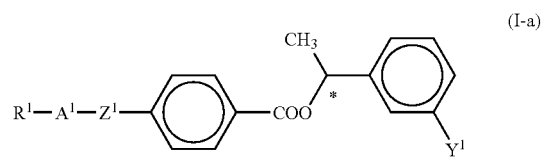

(I-a)

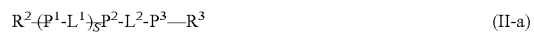

(II-a)

wherein the general formula (II-a) has the same helical twisting direction as the general formula (I-a), and shows a positive temperature dependency for the natural pitch, and a HTP value of at least 3. A bistable liquid crystal display element comprises the liquid crystal composition.

19 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a chiral nematic liquid crystal composition, for which the temperature dependency of the natural pitch and the temperature dependency of the wavelength selective reflection are minimal and the low temperature storage stability is excellent in a bistable liquid crystal display element, and a liquid crystal display element comprising the same.

2. Description of Related Art

In bistable liquid crystal display elements, in order to induce a twisted orientation, a chiral nematic liquid crystal composition containing an optically active compound with a liquid crystal compounds are used, and it is already known that increasing the content C (weight %) of the optically active compound causes a reduction in the natural pitch P (μm), and that for content C values up to several dozen % by weight, the relationship whereby the product of P and C remains constant often applies. Accordingly, the helical twisting power: HTP (1/μm) is defined by the following formula:

$$HTP=1/(P\times 0.01C)$$

(wherein C (weight %) represents the amount added of the optically active compound, and P (μm) represents the natural pitch). This value is used as an evaluation parameter or the twisting power unique to that particular optically active compound.

In a chiral nematic liquid crystal, for a planar state in which the helical axis is perpendicular to the substrate, selective reflection based on Bragg reflection theory occurs. The wavelength of that selective reflection is represented by the following formula:

$$\lambda=n\times P$$

(wherein, λ represents the wavelength selective reflection, n represents the average refractive index of the liquid crystal, and P represents the natural pitch).

In order to achieve bistability characteristics, the natural pitch must be less than approximately 3 μm, and in order to achieve a wavelength selective reflection in the visible light spectrum, the natural pitch must be no more than 0.5 μm, and consequently, an extremely large amount of the optically active compound must be added. However, addition of a large amount of optically active compound can cause problems, including a narrowing of the liquid crystal temperature range, and potential precipitation of the chiral compound during low temperature storage, leading to a deterioration in low temperature storage stability. The use of an optically active compound with a large HTP value is one method that is effective in reducing the amount of the optically active compound that must be added, and a compound represented by the formula (VI-e) shown below has been disclosed in Japanese Unexamined Patent Application, First Publication No. Sho 63-51359 and Japanese Unexamined Patent Application, First Publication No. Hei 6-265899.

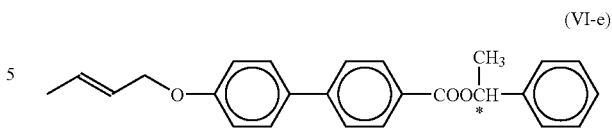
(VI-e)

However, the above publications disclosed only that the temperature dependency of the natural pitch was negative when the compound was used in a STN liquid crystal composition, and examples of applications of the compound to bistable liquid crystal display elements using selective reflection are unknown.

On the other hand, because the natural pitch shows a temperature dependency, the natural pitch fluctuates with the temperature, and variations in temperature cause variations in factors such as the display quality and the operating voltage. As a result, liquid crystal compositions for which the temperature dependency of the natural pitch is small, and the temperature dependency of the wavelength selective reflection is also small, have been keenly sought.

A technique for reducing the temperature dependency of the natural pitch and the temperature dependency of the wavelength selective reflection by combining optically active compounds with left and right helical induction directions has been disclosed in Japanese Unexamined Patent Application, First Publication No. Sho 55-38869. However, this technique is not particularly efficient since sections develop in which the helical twisting power cancel each other out, and because the amount of the optically active compound must be increased to cope with this problem, the liquid crystal temperature range narrows.

Another liquid crystal composition for reducing the temperature dependency of the natural pitch and the temperature dependency of the wavelength selective reflection, by combining an optically active compound for which the temperature dependency of the natural pitch is positive, and a compound for which the temperature dependency is negative, has been disclosed in Japanese Unexamined Patent Application, First Publication No. Hei 7-258641. Specifically, a composition is disclosed that combines a compound with a positive temperature dependency represented by a formula (VI-a) shown below:

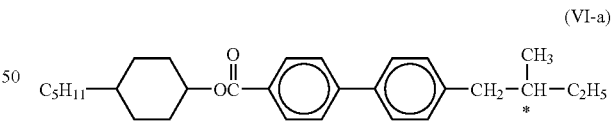
(VI-a)

and a compound with a negative temperature dependency represented by a formula (VI-b) shown below.

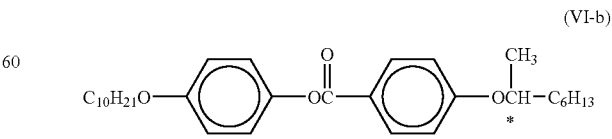
(VI-b)

Here, the description of the natural pitch temperature dependency as positive means that as the temperature rises the pitch increases (stretches). In contrast, a negative natural pitch temperature dependency means that as the temperature rises the pitch decreases (shrinks). However at a temperature of 20° C., the HTP value of the compound represented by the formula (VI-a) is from 5 to 6, and the HTP value of the compound represented by the formula (VI-b) is from 1 to 2, which is extremely small. In order to achieve a bistable liquid crystal using these optically active compounds, approximately 80% by weight of the optically active compounds would need to be added. Addition of this type of extremely large amount of optically active compounds is impossible from a practical standpoint, and even if it were possible, it is clear that the liquid crystal temperature range would be extremely narrow.

In addition, another method for reducing the temperature dependency of the natural pitch, comprising a liquid crystal composition combining an optically active compound represented by a formula (VI-c) shown below:

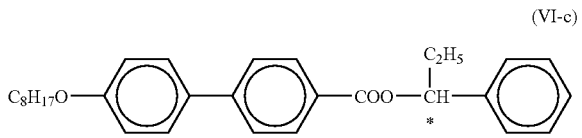

and an optically active compound represented by a formula (VI-d) shown below:

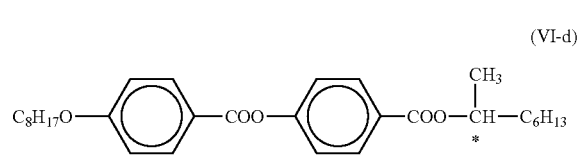

has been disclosed in PCT International Publication No. WO97/29167, and the temperature dependent variation in pitch are reported as 0.07% per 1° C. However, the liquid crystal composition disclosed in PCT International Publication No. WO97/29167 is a STN liquid crystal composition, and in a composition capable of selective reflection, the wavelength selective reflection varies from 560 nm to 580 nm, namely from green to yellow, for a temperature variation from 0 to 50° C., making the composition unsuitable for practical use. Furthermore, a liquid crystal composition containing a large amount of the optically active compounds disclosed in PCT International Publication No. WO97/29167 in order to cause selective reflection also shows problems associated with low temperature storage stability.

In addition, a composition combining an optically active compound (product name: R-1011) represented by a formula (VI-f) shown below:

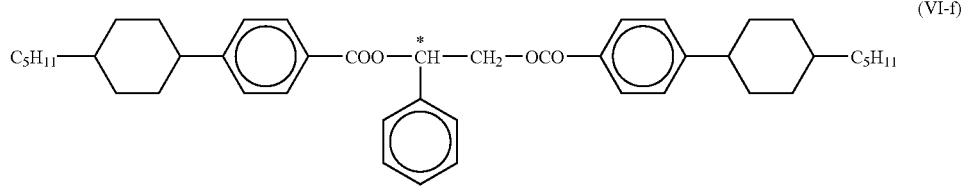

and an optically active compound (product name: R-811) represented by a formula (VI-g) shown below:

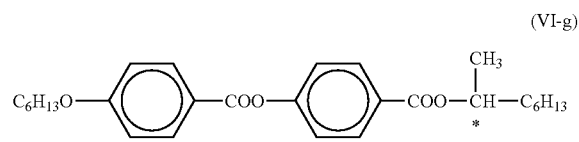

has been disclosed in Japanese Unexamined Patent Application, First Publication No. Hei 11-323338 and Japanese Unexamined Patent Application, First Publication No. Hei 11-305187. This combination of optically active compounds shows a small natural pitch temperature dependency, and is widely used as a liquid crystal composition with selective reflection. However, the optically active compound R-1011 shows poor solubility, and liquid crystal compositions using this compound tend to have problems associated with low temperature storage stability.

As a result, a chiral nematic liquid crystal composition, for which the temperature dependency of the natural pitch and the temperature dependency of the wavelength selective reflection are minimal and the low temperature storage stability is excellent, together with a chiral nematic liquid crystal composition with a broad liquid crystal temperature range, have been keenly sought.

SUMMARY OF THE INVENTION

An object of the present invention is to provide a chiral nematic liquid crystal composition, for which the temperature dependency of the natural pitch and the temperature dependency of the wavelength selective reflection are minimal and the low temperature storage stability is excellent, and a chiral nematic liquid crystal composition with a broad liquid crystal temperature range, for use in a bistable liquid crystal display element, and a bistable liquid crystal display element comprising the composition.

In order to achieve the above object, the present invention provides a liquid crystal composition as described below, together with a liquid crystal display element that utilizes such a composition.

In other words, the present invention provides a chiral nematic liquid crystal composition and a bistable liquid crystal display element comprising the liquid crystal composition, comprising one, or two or more optically active compounds represented by general formula (I-a):

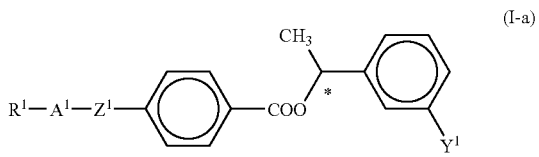

(wherein * indicates the position of an asymmetric carbon atom;

R$^1$ represents an alkyl group having 1 to 10 carbon atoms, an alkenyl group having 2 to 10 carbon atoms, a fluorine atom, a chlorine atom, a bromine atom, an iodine atom, a cyano group, or an isothiocyanate group, the alkyl group or the alkenyl group may be either unsubstituted, or may be substituted with at least one fluorine atom, chlorine atom, cyano group, methyl group or trifluoromethyl group, and at least one methylene group within the alkyl group or the alkenyl group may be substituted with either —CO— group, or with oxygen atom or —COO— group, provided oxygen atoms are not bonded together directly;

A$^1$ represents a 1,4-phenylene group, 1,4-cyclohexylene group, 1,4-cyclohexenylene group, tetrahydropyran-2,5-diyl group, 1,3-dioxane-2,5-diyl group, tetrahydrothiopyran-2,5-diyl group, 1,4-bicyclo[2,2,2]octylene group, decahydronapthalene-2,6-diyl group, pyridine-2,5-diyl group, pyrimidine-2,5-diyl group, pyrazine-2,5-diyl group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, or fluorene-2,7-diyl group, and the 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, or fluorene-2,7-diyl group may be either unsubstituted, or may be substituted with at least one fluorine atom, chlorine atom, trifluoromethyl group, trifluoromethoxy group, or methyl group;

Z$^1$ represents a single bond, or —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$—, or —CH$_2$CH=CHCH$_2$—; and Y$^1$ represents a hydrogen atom, an alkyl group having 1 to 10 carbon atoms, an alkenyl group having 2 to 10 carbon atoms, a fluorine atom, a chlorine atom, a bromine atom, an iodine atom, a cyano group, or an isothiocyanate group, the alkyl group or the alkenyl group may be either unsubstituted, or may be substituted with at least one fluorine atom, chlorine atom, cyano group, methyl group or trifluoromethyl group, and at least one methylene group within the alkyl group or the alkenyl group may be substituted with either —CO— group, or with oxygen atom or —COO— group, provided oxygen atoms are not bonded together directly), and one, or two or more optically active compounds represented by general formula (II-a):

$$R^2 \text{-} (P^1 \text{-} L^1)_s \text{-} P^2 \text{-} L^2 \text{-} P^3 \text{-} R^3 \quad \text{(II-a)}$$

(wherein R$^2$ and R$^3$ each independently represent a hydrogen atom, a fluorine atom, a chlorine atom, a bromine atom, an iodine atom, a cyano group, a phenyl group, an alkyl group having 1 to 10 carbon atoms, or an alkenyl group having 2 to 10 carbon atoms, and the alkyl group or the alkenyl group may be either unsubstituted, or may be substituted with at least one fluorine atom, chlorine atom, cyano group, methyl group or trifluoromethyl group, and at least one methylene group within the alkyl group or the alkenyl group may be substituted with either —CO— group, or with oxygen atom or —COO— group, provided oxygen atoms are not bonded together directly;

P$^1$ and P$^2$ each represent, independently, the same meaning as the group A$^1$ in the general formula (I-a);

P$^3$ represents either the same meaning as the group A$^1$ in the general formula (I-a), or a 1,3-phenylene group, and the 1,3-phenylene group may be either unsubstituted, or may be substituted with at least one fluorine atom, chlorine atom, trifluoromethyl group, trifluoromethoxy group, or methyl group;

L$^1$ and L$^2$ each independently represent a single bond, or —CO—, —COO—, —OCO—, —C≡C—, —CH$_2$CH$_2$—, —CH$_2$CH$_2$CH$_2$—, —CH$_2$CH$_2$CH$_2$CH$_2$—, —CH$_2$COO—, —CH$_2$OCO—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$—, —CH$_2$CH=CHCH$_2$—, or —COOCH$_2$CH$_2$OCO—, and a hydrogen atom of a C—H linkage in —CH$_2$CH$_2$—, —CH$_2$CH$_2$CH$_2$—, —CH$_2$CH$_2$CH$_2$CH$_2$—, —CH$_2$COO—, —CH$_2$OCO—, —CH$_2$O—, —CH$_2$CH$_2$CH=CH—, —CH=CHCH$_2$CH$_2$—, or —COOCH$_2$CH$_2$OCO— may be substituted with an alkyl group having 1 to 5 carbon atoms (in which at least one of the hydrogen atom in the alkyl group may be substituted with a fluorine atom), or a phenyl group; and s represents 0, 1, or 2, and in the case in which s=2, the plurality of P$^1$ and L$^1$ groups may represent the same group or different groups, although at least one of R$^2$, R$^3$, L$^1$ and L$^2$ must be an optically active group), with the same helical twisting direction as the compound represented by the general formula (I-a), a helical twisting power: HTP of at least 3, and for which the natural pitch that is induced upon addition to a nematic liquid crystal increases with rising temperature.

A liquid crystal composition of the present invention is a chiral nematic liquid crystal composition for which the temperature dependency of the natural pitch and the temperature dependency of the wavelength selective reflection are minimal and the low temperature storage stability is excellent, which provides a large effect in improving the display quality of a bistable liquid crystal display element. Furthermore, by using a liquid crystal composition of the present invention, a bistable liquid crystal display element with excellent low temperature storage stability can be produced.

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

As follows is a more detailed description of examples of the present invention. For a compound represented by the general formula (I-a), the temperature characteristics of the natural pitch that is induced upon addition to a nematic liquid crystal are negative. In this compound, the group $Y^1$ is preferably a hydrogen atom, an alkyl group having 1 to 5 carbon atoms, an alkenyl group having 2 to 5 carbon atoms, a fluorine atom, a chlorine atom, a bromine atom, an iodine atom, a cyano group, or an isothiocyanate group (wherein the alkyl group or the alkenyl group may be either unsubstituted, or may be substituted with at least one fluorine atom, chlorine atom, trifluoromethyl group, methyl group, and at least one methylene group within the alkyl group or the alkenyl group may be substituted with either —CO— group, or with oxygen atom or —COO— group, provided oxygen atoms are not bonded together directly), and more preferably a hydrogen atom, an alkyl group having 1 to 3 carbon atoms, an alkenyl group having 2 to 3 carbon atoms, a fluorine atom, a chlorine atom, a bromine atom, or an iodine atom (wherein the alkyl group or the alkenyl group may be either unsubstituted, or may be substituted with at least one fluorine atom, chlorine atom, trifluoromethyl group, cyano group or methyl group, and at least one methylene group within the alkyl group or the alkenyl group may be substituted with either —CO— group, or with oxygen atom or —COO— group, provided oxygen atoms are not bonded together directly), and even more preferably a hydrogen atom, a fluorine atom, a methyl group, a trifluoromethyl group, a methoxy group, or a trifluoromethoxy group, and most preferably a hydrogen atom.

The group $A^1$ is preferably a 1,4-phenylene group, 2-fluoro-1,4-phenylene group, 3-fluoro-1,4-phenylene group, 2,6-difluoro-1,4-phenylene group, 3,5-difluoro-1,4-phenylene group, 1,4-cyclohexylene group, decahydronapthalene-2,6-diyl group, 1,2,3,4-tetrahydronaphtalene-2,6-diyl group, or 2,6-naphthylene group, more preferably a 1,4-phenylene group, 2-fluoro-1,4-phenylene group, 3-fluoro-1,4-phenylene group, 2,6-difluoro-1,4-phenylene group, 3,5-difluoro-1,4-phenylene group, or 1,4-cyclohexylene group, and even more preferably a 1,4-phenylene group or 1,4-cyclohexylene group.

The group $Z^1$ is preferably a single bond, or —$CH_2CH_2$—, —C≡C—, —COO— or —OCO—, and most preferably a single bond. The group $R^1$ is preferably an alkyl group having 1 to 6 carbon atoms or an alkenyl group having 2 to 6 carbon atoms (wherein at least one methylene group within the group may be substituted with oxygen atom, provided oxygen atoms are not bonded together directly), and the alkenyl group is preferably represented by one of the formulas (VII-a):

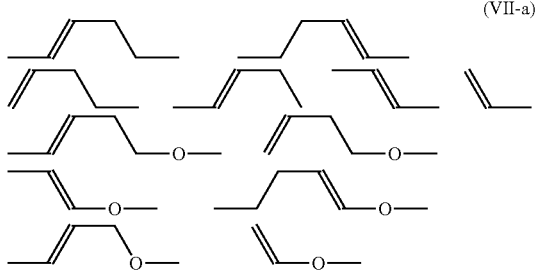

(wherein the structural formulas are linked to the ring through the right end).

In addition, compounds represented by the general formula (I-a) in which:
$R^1$ is an alkyl group having 1 to 10 carbon atoms or an alkenyl group having 2 to 10 carbon atoms (wherein the alkyl group or the alkenyl group may be either unsubstituted, or may contain at least one fluorine atom, trifluoromethyl group, or methyl group, and at least one methylene group within the alkyl group or the alkenyl group may be substituted with either —CO— group, or with oxygen atom or —COO— group, provided oxygen atoms are not bonded together directly), $A^1$ represents a 1,4-phenylene group or a 1,4-cyclohexylene group, $Z^1$ represents a single bond, or —COO—, —OCO—, —C≡C—, or —$CH_2CH_2$—, and $Y^1$ represents a hydrogen atom, an alkyl group having 1 to 3 carbon atoms, an alkenyl group having 2 to 3 carbon atoms, (wherein the alkyl group or the alkenyl group may be either unsubstituted, or may be substituted with at least one fluorine atom, and at least one methylene group within the alkyl group or the alkenyl group may be substituted with either —CO— group, or with oxygen atom or —COO— group, provided oxygen atoms are not bonded together directly), or a fluorine atom, a chlorine atom, a bromine atom, or an iodine atom are preferred, and compounds represented by the general formula (I-a) in which:

$R^1$ is an alkyl group having 1 to 10 carbon atoms or an alkenyl group having 2 to 10 carbon atoms (wherein the alkyl group or the alkenyl group may be either unsubstituted, or may contain at least one fluorine atom, trifluoromethyl group, or methyl group, and at least one methylene group within the alkyl group or the alkenyl group may be substituted with oxygen atoms, provided oxygen atoms are not bonded together directly), $A^1$ represents a 1,4-phenylene group or a 1,4-cyclohexylene group, $Z^1$ represents a single bond, and $Y^1$ represents a hydrogen atom, a methyl group, a methoxy group, a trifluoromethyl group or a trifluoromethoxy group is particularly preferred.

Specific examples of particularly preferred compounds include those represented by general formula (VII-b) through general formula (VII-e) shown below.

(VII-b)

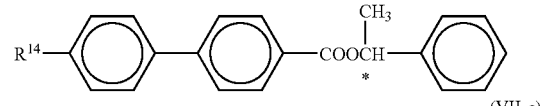

(VII-c)

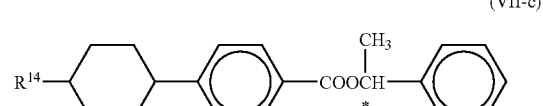

(VII-d)

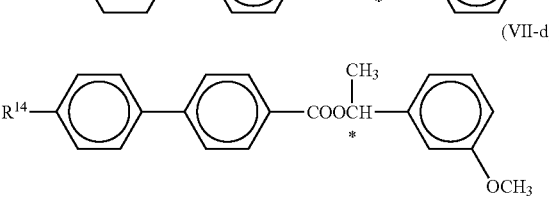

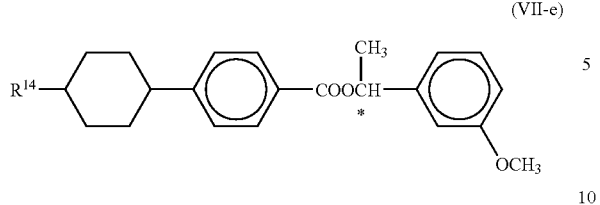

(VII-e)

(wherein * indicates the position of an asymmetric carbon atom, $R^{14}$ represents an alkyl group having 1 to 6 carbon atoms or an alkenyl group having 2 to 6 carbon atoms, and at least one methylene group within the group may be substituted with oxygen atoms, provided oxygen atoms are not bonded together directly). The compounds represented by the general formula (VII-b) in which $R^{14}$ is an alkenyloxy group having 2 to 6 carbon atoms are the most desirable.

The compounds represented by the formula (I-a) have large HTP values, and amongst these compounds, those compounds with the larger HTP values are preferred. Specifically, the HTP value of the compound is preferably at least 8, and even more preferably 12 or greater, and most preferably 16 or greater.

In the formula (II-a), the groups $P^1$ and $P^2$ are each preferably a 1,4-phenylene group, 2-fluoro-1,4-phenylene group, 3-fluoro-1,4-phenylene group, 2,6-difluoro-1,4-phenylene group, 3,5-difluoro-1,4-phenylene group, 1,4-cyclohexylene group, pyrimidine-2,5-diyl group, decahydronapthalene-2,6-diyl group, 1,2,3,4-tetrahydronaphthalene-2,6-diyl group, or 2,6-naphthylene group, and even more preferably a 1,4-phenylene group or 1,4-cyclohexylene group.

The group $P^3$ is preferably a 1,4-phenylene group, 1,4-cyclohexylene group or 1,3-phenylene group, and even more preferably a 1,4-phenylene group or 1,3-phenylene group.

The groups $L^1$ and $L^2$ are each preferably a single bond, or —CO—, —COO—, —OCO—, —C≡C—, —CH$_2$CH$_2$— or —CH$_2$CH$_2$CH$_2$— (wherein a hydrogen atom of a C—H linkage in —CH$_2$CH$_2$— or —CH$_2$CH$_2$CH$_2$— may be substituted with an alkyl group having 1 to 5 carbon atoms, and at least one of the hydrogen atom in this alkyl group may be substituted with a fluorine atom), and even more preferably a single bond, or —COO—, —C≡C—, or —CH$_2$CH$_2$— (wherein a hydrogen atom of a C—H linkage in —CH$_2$CH$_2$— may be substituted with a methyl group or a trifluoromethyl group).

The groups $R^2$ and $R^3$ are each preferably a hydrogen atom, an alkyl group having 1 to 8 carbon atoms, an alkenyl group having 2 to 8 carbon atoms (wherein the alkyl group or the alkenyl group may be either unsubstituted, or may contain at least one fluorine atom, trifluoromethyl group or methyl group, and at least one methylene group within the alkyl group or the alkenyl group may be substituted with either —CO— group, or with oxygen atom or —COO— group, provided oxygen atoms are not bonded together directly), or a cyano group, a fluorine atom or a chlorine atom.

Specific examples of preferred compounds include those represented by general formula (II-4) through general formula (II-6) shown below.

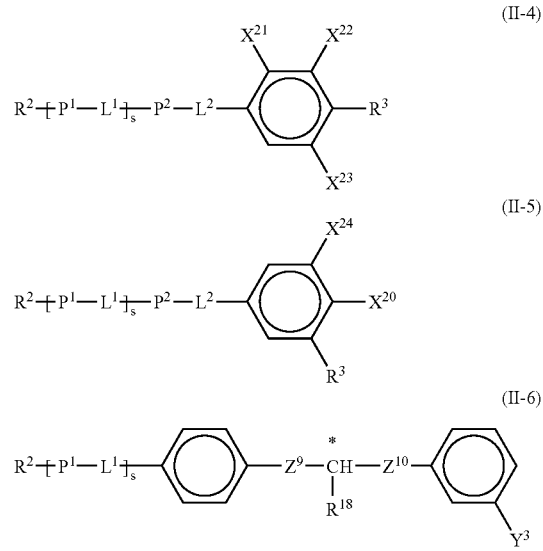

(wherein $R^2$, $R^3$, $P^1$, $P^2$, $L^1$ and $L^2$ each represent the same meaning as described in relation to the general formula (II-a); * indicates the position of an asymmetric carbon atom, $R^{18}$ represents an alkyl group having 1 to 6 carbon atoms or an alkenyl group having 2 to 6 carbon atoms, at least one methylene group within the group may be substituted with oxygen atoms, provided oxygen atoms are not bonded together directly, and at least one hydrogen atom within the group may be substituted with a fluorine atom; $X^{20}$, $X^{21}$, $X^{22}$, $X^{23}$ and $X^{24}$ each independently represent a hydrogen atom, a fluorine atom, or a chlorine atom; $Z^9$ and $Z^{10}$ each independently represent a single bond or —CH$_2$—, —CH$_2$CH$_2$—, —O—, —COCH$_2$—, —CH$_2$CO—, —OCH$_2$—, or —CH$_2$O—; and $Y^3$ represents a hydrogen atom, a fluorine atom, a chlorine atom, a bromine atom, an iodine atom, an alkyl group having 1 to 10 carbon atoms, or an alkenyl group having 2 to 10 carbon atoms, and at least one methylene group within the group may be substituted with oxygen atoms, provided oxygen atoms are not bonded together directly, and at least one hydrogen atom within the group may be substituted with a fluorine atom; although in the general formula (II-4) and the general formula (II-5), at least one of $R^2$ and $R^3$ must be an optically active group)

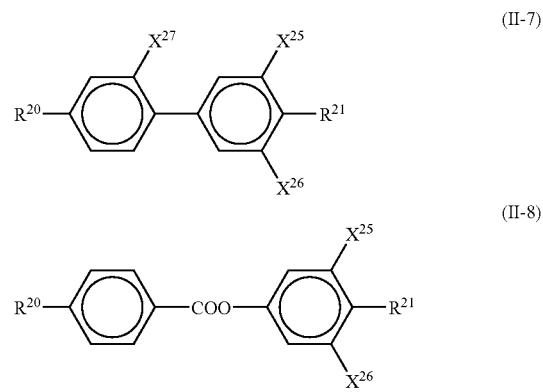

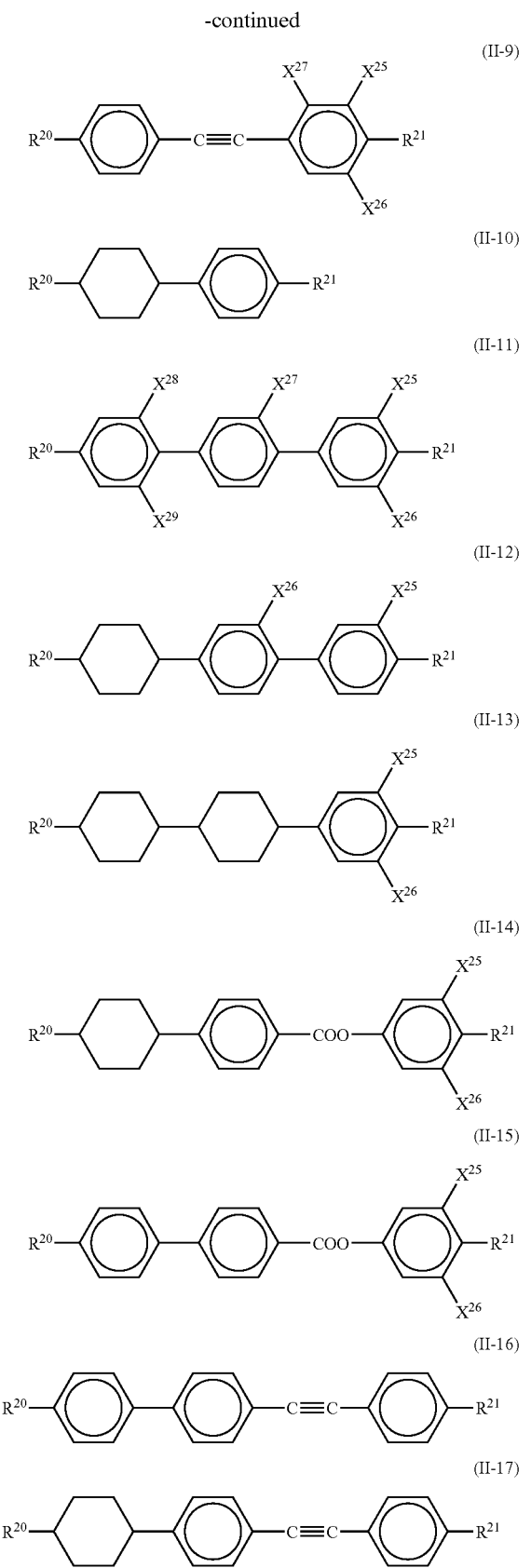

Examples of preferred compounds represented by the general formula (II-4) include the compounds represented by general formula (II-7) through general formula (II-19).

(wherein $R^{20}$ and $R^{21}$ each independently represent a cyano group, a fluorine atom, an alkyl group having 1 to 8 carbon atoms or an alkenyl group having 2 to 8 carbon atoms, the alkyl group or the alkenyl group may be either unsubstituted, or may contain at least one fluorine atom, chlorine atom, trifluoromethyl group or methyl group, and at least one methylene group within the group may be substituted with either —CO— group, or with oxygen atom or —COO— group, provided oxygen atoms are not bonded together directly; and $X^{25}$, $X^{26}$, $X^{27}$, $X^{28}$ and $X^{29}$ each independently represent a hydrogen atom, a fluorine atom or a chlorine atom; although at least one of $R^{20}$ and $R^{21}$ must be an optically active group)

Of the compounds represented by the general formula (II-5), compounds represented by the general formula (II-20) shown below are preferred.

(wherein $R^{22}$ and $R^{23}$ each independently represent an alkyl group having 1 to 8 carbon atoms or an alkenyl group having 2 to 8 carbon atoms, at least one methylene group within the group may be substituted with oxygen atoms, provided oxygen atoms are not bonded together directly, and at least one hydrogen atom within the group may be substituted with a fluorine atom; and $R^{23}$ must be an optically active group)

Of the compounds represented by the general formula (II-6), compounds represented by the general formula (II-21) shown below are preferred.

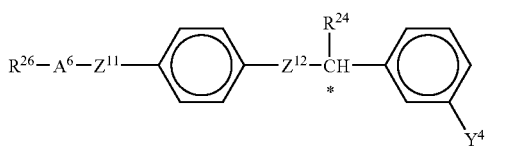
(II-21)

(wherein $R^{26}$ represents a fluorine atom, a chlorine atom, a bromine atom, an iodine atom, a cyano group, an alkyl group having 1 to 10 carbon atoms, or an alkenyl group having 2 to 10 carbon atoms, and at least one methylene group within the group may be substituted with either —CO— group, or with oxygen atom or —COO— group, provided oxygen atoms are not bonded together directly; * indicates the position of an asymmetric carbon atom;

$R^{24}$ represents an alkyl group having 1 to 5 carbon atoms or an alkenyl group having 2 to 5 carbon atoms, at least one methylene group within the group may be substituted with either —CO— group, or with oxygen atom or —COO— group, provided oxygen atoms are not bonded together directly, and at least one hydrogen atom within the group may be substituted with a fluorine atom;

$Z^{11}$ represents a single bond, or —CO—, —COO—, —OCO—, —C≡C—, or —CH$_2$CH$_2$—;

$Z^{12}$ represents —CH$_2$—, —CH$_2$CH$_2$—, —O—, —COCH$_2$—, —CH$_2$CO—, —OCH$_2$—, or CH$_2$O—;

$Y^4$ represents a hydrogen atom, a fluorine atom, a chlorine atom, a bromine atom, an iodine atom, a methyl group, a trifluoromethyl group, a methoxy group or a trifluoromethoxy group; and $A^6$ represents a 1,4-phenylene group, 2-fluoro-1,4-phenylene group, 3-fluoro-1,4-phenylene group, 2,6-difluoro-1,4-phenylene group, 3,5-difluoro-1,4-phenylene group, or 1,4-cyclohexylene group)

Furthermore, of the compounds represented by the general formula (II-a), compounds represented by the general formula (II-31), the general formula (II-32) or the general formula (II-33) shown below is even more preferred.

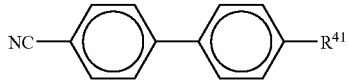
(II-31)

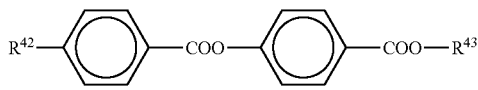
(II-32)

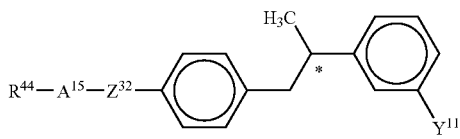
(II-33)

(wherein $R^{41}$ represents an alkyl group having 1 to 10 carbon atoms or an alkenyl group having 2 to 10 carbon atoms, the alkyl group or the alkenyl group may be either unsubstituted, or may contain at least one fluorine atom, trifluoromethyl group or methyl group, at least one methylene group within the alkyl group or the alkenyl group may be substituted with either —CO— group, or with oxygen atom or —COO— group, provided oxygen atoms are not bonded together directly, and the alkyl group or the alkenyl group has at least one asymmetric carbon atom; * indicates the position of an asymmetric carbon atom;

$R^{42}$ and $R^{43}$ each independently represent a fluorine atom, a chlorine atom, a bromine atom, an iodine atom, a cyano group, an alkyl group having 1 to 10 carbon atoms, or an alkenyl group having 2 to 10 carbon atoms, at least one methylene group within the alkyl group or the alkenyl group may be substituted with either —CO— group, or with oxygen atom or —COO— group, provided oxygen atoms are not bonded together directly, the alkyl group or the alkenyl group may be either unsubstituted, or may contain at least one fluorine atom, chlorine atom, trifluoromethyl group or methyl group, and at least one of $R^{42}$ and $R^{43}$ contains at least one asymmetric carbon atom;

$R^{44}$ represents a cyano group, a fluorine atom, a chlorine atom, an alkyl group having 1 to 6 carbon atoms, or an alkenyl group having 2 to 6 carbon atoms, the alkyl group or the alkenyl group may be either unsubstituted, or may contain at least one fluorine atom, chlorine atom, trifluoromethyl group or methyl group, and at least one methylene group within the alkyl group or the alkenyl group may be substituted with either —CO— group, or with oxygen atom or —COO— group, provided oxygen atoms are not bonded together directly;

$Z^{32}$ represents —CO—, —COO—, —OCO—, —C≡C—, or —CH$_2$CH$_2$—;

$A^{15}$ represents a 1,4-phenylene group, 2-fluoro-1,4-phenylene group, 3-fluoro-1,4-phenylene group, 2,6-difluoro-1,4-phenylene group, 3,5-difluoro-1,4-phenylene group, or 1,4-cyclohexylene group; and $Y^{11}$ represents a hydrogen atom, a fluorine atom, a chlorine atom, a bromine atom, an iodine atom, a methyl group, a trifluoromethyl group, a methoxy group or a trifluoromethoxy group)

Specific examples of the general formula (II-33) include the compounds represented by general formula (II-22) through general formula (II-26) shown below.

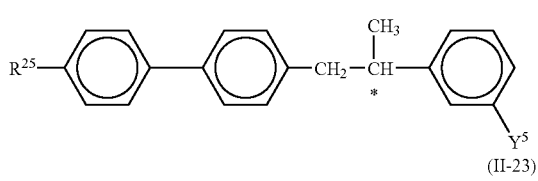
(II-22)

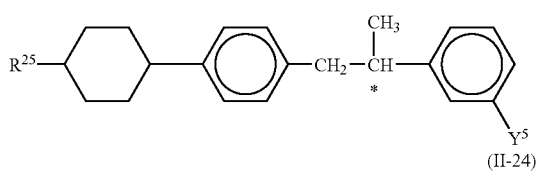
(II-23)

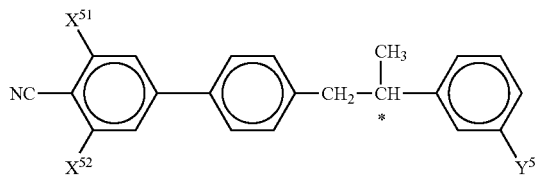
(II-24)

-continued

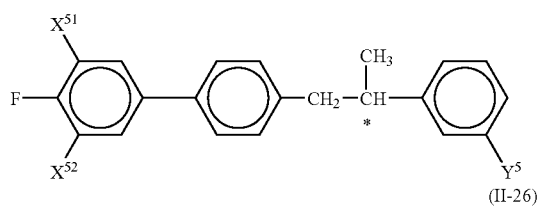

(II-25)

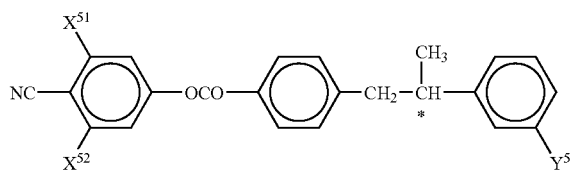

(II-26)

(wherein * indicates the position of an asymmetric carbon atom; $R^{25}$ represents an alkyl group having 1 to 6 carbon atoms or an alkenyl group having 2 to 6 carbon atoms, at least one methylene group within the group may be substituted with oxygen atoms, provided oxygen atoms are not bonded together directly, and at least one hydrogen atom within the group may be substituted with a fluorine atom; $X^{51}$ and $X^{52}$ each independently represent a hydrogen atom, a fluorine atom, or a chlorine atom; and $Y^5$ represents a hydrogen atom, a fluorine atom, a methyl group, a trifluoromethyl group, a methoxy group, or a trifluoromethoxy group)

In addition, of the compounds represented by the general formula (II-31), the general formula (II-32) and the general formula (II-33), compounds represented by the general formulas (II-31) and (II-32) are the most preferred.

However, of these compounds of the general formulas (II-1) to (II-33), only compounds which show the same helical twisting direction as the first component, have a helical twisting power of at least 3, and for which the temperature characteristics of the natural pitch that is induced upon addition to a nematic liquid crystal are positive, are usable for the present invention.

The helical twisting power was measured at 25° C. of a liquid crystal composition (Z) by adding 1% by weight of a compound shown below (wherein % refers to % by weight).

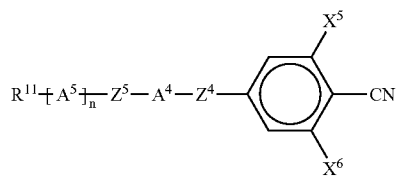

These compounds represented by the general formula (II-a) preferably have an HTP value of at least 4, and values of 7 or greater are even more preferred.

By suitably combining this type of material for which the temperature dependency of the natural pitch is positive, with a material represented by the general formula (I-a) for which the temperature dependency of the natural pitch is negative, the temperature dependency of the natural pitch can be reduced, and moreover, because the compound represented by the general formula (I-a) has a large HTP value and shows excellent compatibility, a chiral nematic liquid crystal composition with excellent low temperature stability can be produced.

Furthermore, because compounds represented by the general formula (II-31) or the general formula (II-32) is comparatively easy to procure, the cost of combinations with a compound represented by the general formula (I-a) can be kept comparatively low.

The amount added of the compound represented by the general formula (I-a) is preferably within a range from 3 to 20% by weight, and even more preferably from 5 to 15% by weight. The amount of the compound represented by the general formula (II-a) is preferably within a range from 3 to 30% by weight, and even more preferably from 5 to 25% by weight, and most preferably from 5 to 15% by weight.

In order to reduce the driving voltage, a compound represented by general formula (IV) with a strongly polar group is also preferably added to the composition.

$$R^{11}\text{-}\!\!\left(\!A^5\!\right)_{\!n}\!\!\text{-}Z^5\text{-}A^4\text{-}Z^4\text{-}\!\!\bigodot\!\!\text{-}CN \quad (IV)$$

with $X^5$ and $X^6$ on the ring.

(wherein $R^{11}$ represents an alkyl group having 1 to 10 carbon atoms, or an alkenyl group having 2 to 10 carbon atoms, the alkyl group or the alkenyl group may be either unsubstituted, or may contain at least one fluorine atom, chlorine atom, trifluoromethyl group or methyl group, and at least one methylene group within the alkyl group or the alkenyl group may be substituted with either —CO— group, or with oxygen atom or —COO— group, provided oxygen atoms are not bonded together directly;

$Z^4$ and $Z^5$ each independently represent a single bond, or —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$—, or —CH$_2$CH=CHCH$_2$—;

$A^4$ and $A^5$ each independently represent a 1,4-phenylene group, a 1,4-cyclohexylene group or a pyrimidine-2,5-diyl group, and the 1,4-phenylene group may be either unsubstituted, or may contain at least one fluorine atom, chlorine atom, trifluoromethyl group, trifluoromethoxy group or methyl group;

$X^5$ and $X^6$ each independently represent a hydrogen atom, a chlorine atom or a fluorine atom; and n represents either 0 or 1)

The group $R^{11}$ with the general formula (IV) is preferably an alkyl group having 1 to 6 carbon atoms, or an alkenyl group having 2 to 6 carbon atoms (wherein at least one methylene group within the group may be substituted with oxygen atoms, provided oxygen atoms are not bonded together directly), and the alkenyl group is preferably one of the group from the formulas (VII-a). The groups $Z^4$ and $Z^5$ are preferably either single bonds or —COO— groups, and compounds in which $Z^5$ is a single bond and $Z^4$ is either a single bond or a —COO— group are particularly preferred. The groups $A^4$ and $A^5$ each preferably represent a 1,4-phenylene group, 2-fluoro-1,4-phenylene group, 3-fluoro-1,4-phenylene group, 2,6-difluoro-1,4-phenylene group, 3,5-difluoro-1,4-phenylene group, 1,4-cyclohexylene group, or pyrimidine-2,5-diyl group, and a 1,4-phenylene group or a 1,4-cyclohexylene group are particularly preferred. n is preferably 0. Specific examples of these preferred compounds include the compounds represented by general formula (IX-e) through general formula (IX-k) shown below.

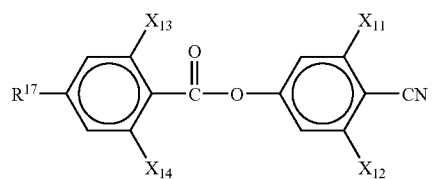

(IX-e)

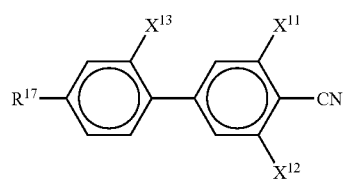

(IX-f)

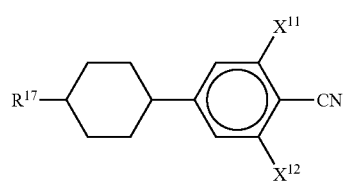

(IX-g)

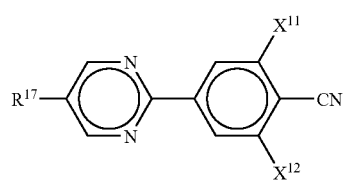

(IX-h)

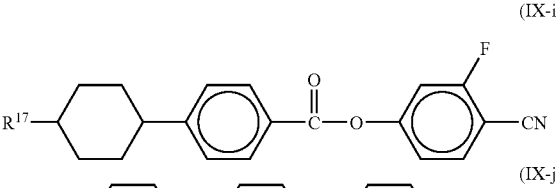

(IX-i)

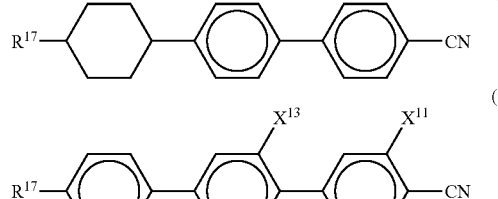

(IX-j)

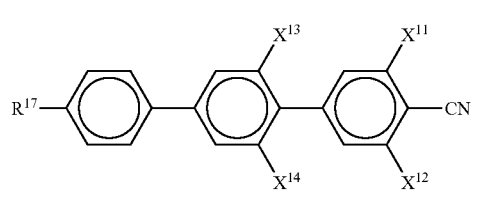

(IX-k)

(wherein $R^{17}$ represents an alkyl group having 1 to 6 carbon atoms, or an alkenyl group having 2 to 6 carbon atoms, and at least one methylene group within the group may be substituted with oxygen atoms, provided oxygen atoms are not bonded together directly; and $X^{11}$, $X^{12}$, $X^{13}$ and $X^{14}$ each independently represent a hydrogen atom, a fluorine atom or a chlorine atom.

The addition amount of the compound represented by the general formula (IV) within a range from 10 to 65% by weight is preferable, and the addition of the compound represented by the general formula (IV) within a range from 20 to 60% by weight is even more preferable. It is preferable that the content of the compound represented by the general formula (I-a) be from 3 to 20% by weight, the content of the group of compounds represented by the general formula (II-1), the general formula (II-2), and the general formula (II-3) be from 3 to 30% by weight, and the content of the compound represented by the general formula (IV) be 10 to 65% by weight. It is even more desirable that the content of the compound represented by the general formula (I-a) be from 3 to 15% by weight, the content of the group of compounds represented by the general formula (II-1), the general formula (II-2) and the general formula (II-3) be from 3 to 15% by weight, and the content of the compound represented by the general formula (IV) be from 10 to 60% by weight.

A bistable liquid crystal typically utilizes selective reflection in a planar state in which the helical axis is perpendicular to the substrate. It is well known that the full width at half maximum (Δλ) of that selective reflected light is represented by the following formula:

$$\Delta\lambda = \Delta n \times P$$

(wherein Δn represents the refractive index anisotropy of the liquid crystal composition, and P represents the natural pitch). As a result, by using a liquid crystal composition having a large Δn value is used, a bright display can be achieved. Accordingly, addition of either a compound represented by general formula (III):

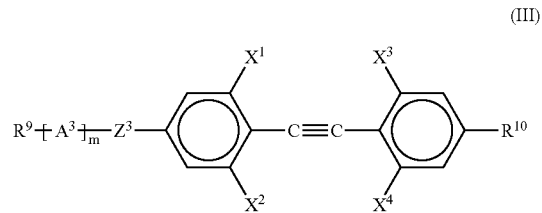

(III)

(wherein $R^9$ and $R^{10}$ each independently represent an alkyl group having 1 to 10 carbon atoms, or an alkenyl group having 2 to 10 carbon atoms, the alkyl group or the alkenyl group may be either unsubstituted, or may contain at least one fluorine atom, chlorine atom, trifluoromethyl group or methyl group, and at least one methylene group within the alkyl group or the alkenyl group may be substituted with either —CO— group, or with oxygen atom or —COO— group, provided oxygen atoms are not bonded together directly;

$Z^3$ represents a single bond, or —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH₂CH₂CH=CH—, —CH=CHCH₂CH₂—, or —CH₂CH=CHCH₂—;

A³ represents a 1,4-phenylene group or a 1,4-cyclohexylene group, and the 1,4-phenylene group may be either unsubstituted, or may contain at least one fluorine atom, chlorine atom, trifluoromethyl group, trifluoromethoxy group or methyl group;

$X^1$, $X^2$, $X^3$ and $X^4$ each independently represent a hydrogen atom, a fluorine atom, a chlorine atom or a methyl group; and m represents either 0 or 1), or a compound represented by general formula (V):

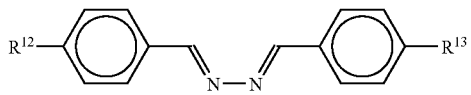

(V)

(wherein $R^{12}$ and $R^{13}$ each independently represent an alkyl group having 1 to 10 carbon atoms, or an alkenyl group having 2 to 10 carbon atoms, the alkyl group or the alkenyl group may be either unsubstituted, or may contain at least one fluorine atom, chlorine atom, trifluoromethyl group or methyl group, and at least one methylene group within the alkyl group or the alkenyl group may be substituted with either —CO— group, or with oxygen atom or —COO— group, provided oxygen atoms are not bonded together directly) is preferred.

In the general formula (III), the groups $R^9$ and $R^{10}$ preferably each represent an alkyl group having 1 to 6 carbon atoms, or an alkenyl group having 2 to 6 carbon atoms (wherein at least one methylene group within the group may be substituted with oxygen atoms, provided oxygen atoms are not bonded together directly), and the alkenyl group is preferably one of the groups from the formulas (VII-a). The group A³ is preferably a 1,4-phenylene group, 2-fluoro-1,4-phenylene group, 3-fluoro-1,4-phenylene group, 2,6-difluoro-1,4-phenylene group, 3,5-difluoro-1,4-phenylene group, or 1,4-cyclohexylene group, and a 1,4-phenylene group or a 1,4-cyclohexylene group is particularly preferred. $Z^3$ is preferably a single bond, or —COO—, —OCO—, or —CH₂CH₂—, and a single bond and —COO— are particularly desirable. $X^1$, $X^2$, $X^3$ and $X^4$ preferably each represent a hydrogen atom or a fluorine atom, and hydrogen atoms are particularly desirable. Specific examples of these preferred compounds include the compounds represented by general formula (IX-a) through general formula (IX-d) shown below.

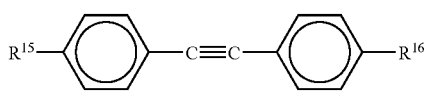

(IX-a)

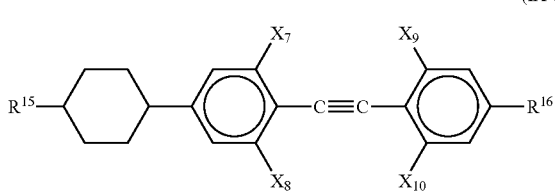

(IX-b)

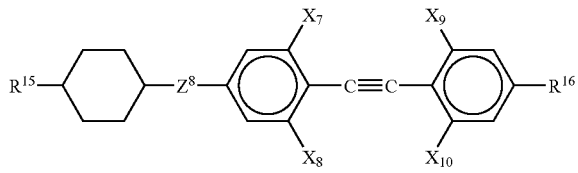

(IX-c)

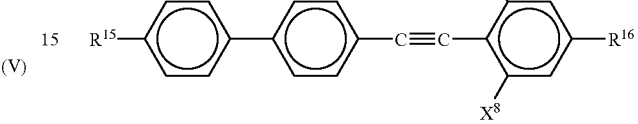

(IX-d)

(wherein $R^{15}$ and $R^{16}$ each independently represent an alkyl group having 1 to 6 carbon atoms, or an alkenyl group having 2 to 6 carbon atoms, and at least one methylene group within the group may be substituted with oxygen atoms, provided oxygen atoms are not bonded together directly; $Z^8$ represents a single bond or —COO—; and $X^7$, $X^8$, $X^9$ and $X^{10}$ each independently represent a hydrogen atom or a fluorine atom)

In the general formula (V), the groups $R^{12}$ and $R^{13}$ preferably each represent an alkyl group having 1 to 6 carbon atoms, or an alkenyl group having 2 to 6 carbon atoms (wherein at least one methylene group within the group may be substituted with oxygen atoms, provided oxygen atoms are not bonded together directly), and the alkenyl group is preferably one of the groups from the formulas (VII-a).

The amount added of the compounds represented by the general formula (III) and the general formula (V) is preferably within a range from 20 to 60% by weight, and even more preferably from 30 to 50% by weight of a composition. Compositions in which the compound represented by the general formula (I-a) comprises 3 to 20% by weight, the group of compounds represented by the general formula (II-1), the general formula (II-2) and the general formula (II-3) comprises 3 to 30% by weight, and the compounds represented by the general formula (III) and the general formula (V) account for 5 to 60% by weight are preferred, and compositions in which the compound represented by the general formula (I-a) comprises 3 to 15% by weight, the group of compounds represented by the general formula (II-1), the general formula (II-2) and the general formula (II-3) comprises 3 to 15% by weight, and the compounds represented by the general formula (III) and the general formula (V) account for 20 to 60% by weight are even more desirable.

Combining compounds represented by the general formula (III) and the general formula (V), with a compound represented by the general formula (IV) is preferred in terms of achieving a high reflectance and a low driving voltage. The amounts added of these compounds are preferably from 3 to 15% by weight for the compound represented by the general formula (I-a), from 3 to 15% by weight for the group of compounds represented by the general formula (II-1), the general formula (II-2) and the general formula (II-3), and from 50 to 80% by weight for the group of compounds represented by the general formula (IV), the general formula (III) and the general formula (V), and compositions in which the compound represented by the general formula (I-a) comprises 3 to 15% by weight, the group of compounds represented by the general formula (II-1), the general formula (II-2) and the general formula (II-3) comprises 3 to 15% by weight, the group of compounds represented by the general formula (III) and the general formula (V) comprises 10 to 40%, and the compound represented by the general formula (IV) comprises 10 to 40% by weight are even more desirable.

By employing the invention described above, a chiral nematic liquid crystal composition can be obtained for which the temperature dependency of the natural pitch and the temperature dependency of the wavelength selective reflection are minimal and the low temperature storage stability is excellent. In addition, of these liquid crystal compositions, a composition described below is able to also provide a broader liquid crystal temperature range.

In other words, a liquid crystal composition comprising:
from 5 to 15% by weight of at least one optically active compound represented by general formula (I-b):

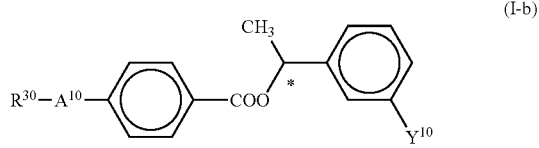

(wherein * indicates the position of an asymmetric carbon atom; $R^{30}$ represents an alkyl group having 1 to 10 carbon atoms or an alkenyl group having 2 to 10 carbon atoms, the alkyl group or the alkenyl group may be either unsubstituted, or may contain at least one fluorine atom, trifluoromethyl group, or methyl group, and at least one methylene group within the alkyl group or the alkenyl group may be substituted with either —CO— group, or with oxygen atom or —COO— group, provided oxygen atoms are not bonded together directly;
$A^{10}$ represents a 1,4-phenylene group or a 1,4-cyclohexylene group; and
$Y^{10}$ represents a hydrogen atom, a methyl group, a methoxy group, a trifluoromethyl group, or a trifluoromethoxy group),
from 3 to 15% by weight of at least one compound selected from a group consisting of optically active compounds represented by general formula (II-d) and general formula (II-e):

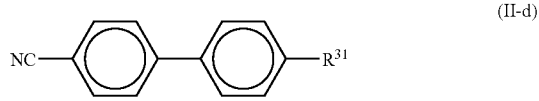

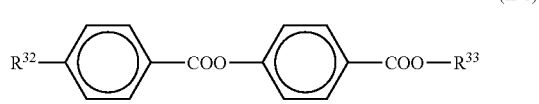

(wherein $R^{31}$, $R^{32}$ and $R^{33}$ each independently represent an alkyl group having 1 to 10 carbon atoms or an alkenyl group having 2 to 10 carbon atoms, the alkyl group or the alkenyl group may be either unsubstituted, or may contain at least one fluorine atom, trifluoromethyl group, or methyl group, although $R^{31}$ and $R^{33}$ must have at least one asymmetric carbon atom, and at least one methylene group within the alkyl group or the alkenyl group may be substituted with either —CO— group, or with oxygen atom or —COO— group, provided oxygen atoms are not bonded together directly), with the same helical twisting direction as the first component, and for which the natural pitch that is induced upon addition to a nematic liquid crystal increases with rising temperature, and from 20 to 50% by weight of at least one compound represented by general formula (IV-b):

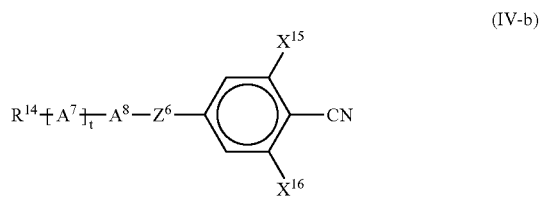

(wherein $R^{14}$ represents an alkyl group having 1 to 10 carbon atoms or an alkenyl group having 2 to 10 carbon atoms, and at least one methylene group within the alkyl group or the alkenyl group may be substituted with oxygen atoms, provided oxygen atoms are not bonded together directly;
$A^7$ and $A^8$ each independently represent a 1,4-phenylene group, a 1,4-cyclohexylene group or a pyrimidine-2,5-diyl group, and the 1,4-phenylene group may be either unsubstituted, or may be substituted with at least one fluorine atom or chlorine atom;
$Z^6$ represents a single bond, —COO— or —CH$_2$CH$_2$—;
$X^{15}$ and $X^{16}$ each independently represent a hydrogen atom, a fluorine atom, or a chlorine atom; and
t represents either 0 or 1, although if t=0 then $Z^6$ represents a single bond) is preferred.

The group $Y^{10}$ of the compound represented by the general formula (I-b) is preferably a hydrogen atom, a methyl group, a methoxy group, a trifluoromethyl group or a trifluoromethoxy group, even more preferably a hydrogen atom or a methoxy group, and most preferably a hydrogen atom. The group $A^{10}$ is preferably a 1,4-phenylene group or a 1,4-cyclohexylene group, and most preferably a 1,4-phenylene group. The group $R^{30}$ is preferably an alkyl group having 1 to 6 carbon atoms or an alkenyl group having 2 to 6 carbon atoms (wherein at least one methylene group within the group may be substituted with oxygen atoms, provided oxygen atoms are not bonded together directly), and one of the alkenyl groups represented by the formulas (VII-a) is even more preferred.

Specific examples of these preferred compounds include the compounds represented by general formula (VI-h) through general formula (VI-k) shown below.

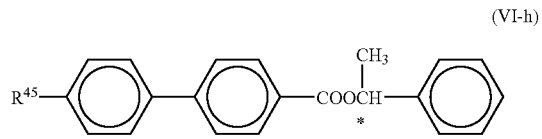

-continued

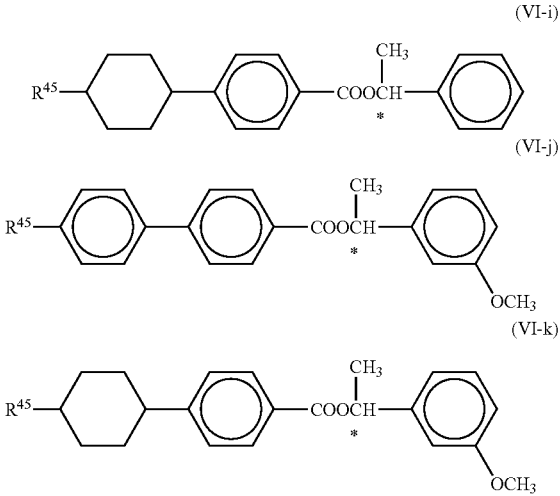

(VI-i)

(VI-j)

(VI-k)

(wherein * indicates the position of an asymmetric carbon atom; $R^{45}$ represents an alkyl group having 1 to 6 carbon atoms or an alkenyl group having 2 to 6 carbon atoms, and at least one methylene group within the group may be substituted with oxygen atoms, provided oxygen atoms are not bonded together directly), and the compounds represented by the general formula (VI-h) in which $R^{45}$ is an alkenyloxy group having 2 to 6 carbon atoms are the most preferred.

The amount added of the compound represented by the formula (I-b) is preferably from 5 to 15% by weight, and even more preferably from 8 to 14% by weight of a composition.

The compounds represented by the general formula (I-b) have large HTP values, and amongst these compounds, those compounds with the larger HTP values are preferred. Specifically, the HTP value of the compound is preferably at least 8, and even more preferably 12 or greater, and most preferably 16 or greater.

In the general formula (II-d) and the general formula (II-e), the groups $R^{31}$ and $R^{33}$ have at least one asymmetric carbon atom. Specifically, optically active groups represented by general formula (V-b) shown below are preferred,

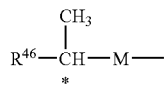

(V-b)

(wherein * indicates the position of an asymmetric carbon atom; $R^{46}$ represents an alkyl group having 1 to 6 carbon atoms or an alkenyl group having 2 to 6 carbon atoms, and M represents a single bond or an alkylene group having 1 to 3 carbon atoms, and at least one methylene group within said alkylene group may be substituted with either —CO— group, or with oxygen atom or —COO— group, provided oxygen atoms are not bonded together directly), groups in which $R^{46}$ is an alkyl group having 1 to 6 carbon atoms are particularly desirable, and groups in which M is an alkylene group having 1 to 3 carbon atoms are also particularly desirable.

The group $R^{32}$ in the general formula (II-e) is preferably an alkyl group having 1 to 8 carbon atoms or an alkenyl group having 2 to 8 carbon atoms (wherein the alkyl group or the alkenyl group may be either unsubstituted, or may contain at least one fluorine atom, trifluoromethyl group, or methyl group, and at least one methylene group within the alkyl group or the alkenyl group may be substituted with either —CO— group, or with oxygen atom or —COO— group, provided oxygen atoms are not bonded together directly).

Specific examples of particularly preferred compounds include the compounds represented by general formula (VII-f) or general formula (VII-g) shown below, and compounds represented by the general formula (VII-g) are the most preferred.

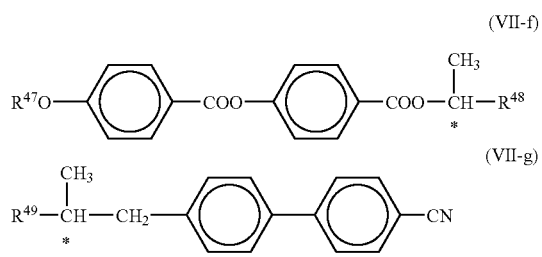

(VII-f)

(VII-g)

(wherein * indicates the position of an asymmetric carbon atom, and $R^{47}$, $R^{48}$ and $R^{49}$ each independently represent an alkyl group having 2 to 8 carbon atoms)

The HTP value of compounds represented by the general formula (II-d) and the general formula (II-e) are preferably at least 4, and even more preferably 7 or greater. Furthermore, the amount added of these compounds is preferably within a range from 3 to 15% by weight, and even more preferably from 5 to 11% by weight of a composition.

The compound represented by the general formula (IV-b) is a necessary component for reducing the driving voltage. In addition to the compounds represented by the general formula (IV-b), compounds that are typically used for reducing the driving voltage include compounds represented by general formula (VIII) shown below:

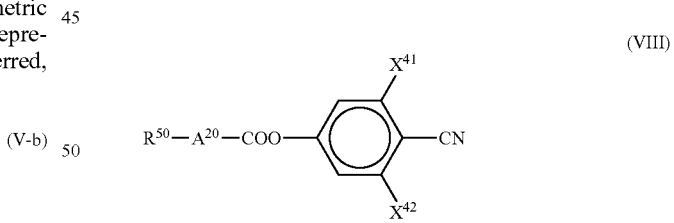

(VIII)

(wherein $R^{50}$ represents an alkyl group having 1 to 10 carbon atoms or an alkenyl group having 2 to 10 carbon atoms, $A^{20}$ represents a 1,4-phenylene group or a 1,4-cyclohexylene group, and $X^{41}$ and $X^{42}$ each independently represent a hydrogen atom or a fluorine atom), although compositions which incorporate larger amounts of compounds represented by the general formula (IV-b), that is, compounds with structures in which the cyclic structure is bonded directly, are better able to suppress the amount of the added optically active compounds to lower levels.

Of the compounds represented by the general formula (IV-b), compounds represented by the general formula (IV-a) are preferred.

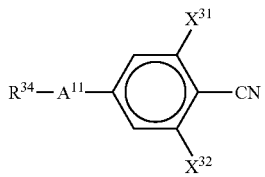
(IV-a)

(wherein $R^{34}$ represents an alkyl group having 1 to 10 carbon atoms or an alkenyl group having 2 to 10 carbon atoms, and at least one methylene group within the alkyl group or the alkenyl group may be substituted with oxygen atoms, provided oxygen atoms are not bonded together directly;

$A^{11}$ represents a 1,4-phenylene group, a 1,4-cyclohexylene group or a pyrimidine-2,5-diyl group, and the 1,4-phenylene group may be either unsubstituted, or may be substituted with at least one fluorine atom or chlorine atom; and $X^{31}$ and $X^{32}$ each independently represent a hydrogen atom, a fluorine atom, or a chlorine atom)

The group $R^{34}$ in the general formula (IV-a) is preferably an alkyl group having 1 to 5 carbon atoms or an alkenyl group having 2 to 5 carbon atoms (wherein at least one methylene group within the alkyl group or the alkenyl group may be substituted with either —CO— group, or with oxygen atom or —COO— group, provided oxygen atoms are not bonded together directly). Of such groups, if compounds in which the group $R^{34}$ is an alkyl group having 2 or 3 carbon atoms or an alkenyl group having 2 or 3 carbon atoms account for at least 70% by weight of the general formula (IV-a), then the amount of added optically active compounds can be suppressed, which is desirable.

The group $A^{11}$ is preferably a 1,4-phenylene group or a 1,4-cyclohexylene group (wherein the 1,4-phenylene group may be either unsubstituted, or may be substituted with at least one fluorine atom), and 1,4-cyclohexylene group are particularly preferred.

The groups $X^{31}$ and $X^{32}$ each preferably represent a hydrogen atom or a fluorine atom, and compounds in which at least one of these groups is a fluorine atom are particularly preferred.

Specific examples of particularly preferred compounds include the compounds represented by general formula (IX-l) through general formula (IX-n) shown below.

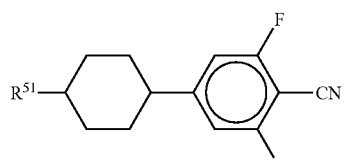
(IX-l)

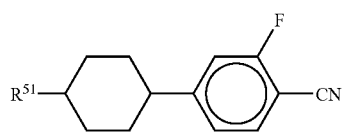
(IX-m)

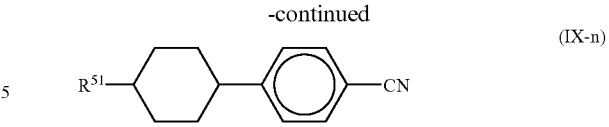
(IX-n)

(wherein $R^{51}$ represents an alkyl group having 1 to 5 carbon atoms or an alkenyl group having 2 to 5 carbon atoms (wherein at least one methylene group within the group may be substituted with oxygen atoms, provided oxygen atoms are not bonded together directly)

The amount added of the compound represented by the general formula (IV-b) is preferably within a range from 20 to 50% by weight, and even more preferably from 23 to 40% by weight of a composition.

In addition, in terms of achieving high reflectance and low viscosity characteristics, liquid crystal compositions containing at least one compound selected from the group of compounds represented by the general formula (III-a) and the general formula (V-a) shown below are preferred.

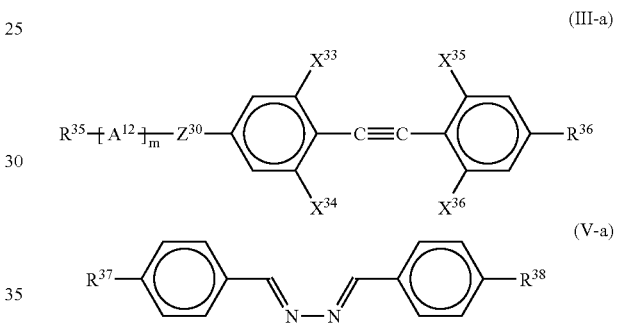
(III-a)

(V-a)

(wherein $R^{35}$, $R^{36}$, $R^{37}$ and $R^{38}$ each independently represent an alkyl group having 1 to 10 carbon atoms or an alkenyl group having 2 to 10 carbon atoms, and at least one methylene group within the alkyl group or the alkenyl group may be substituted with either —CO— group, or with oxygen atom or —COO— group, provided oxygen atoms are not bonded together directly;

$Z^{30}$ represents a single bond, or —CO—, —COO—, —OCO— or —CH$_2$CH$_2$—;

$A^{12}$ represents a 1,4-phenylene group or a 1,4-cyclohexylene group, and the 1,4-phenylene group may be either unsubstituted, or may contain at least one fluorine atom, chlorine atom, trifluoromethyl group, trifluoromethoxy group or methyl group;

$X^{33}$, $X^{34}$, $X^{35}$ and $X^{36}$ each independently represent a hydrogen atom, a fluorine atom, a chlorine atom or a methyl group; and p represents either 0 or 1)

In the general formula (III-a) and the general formula (V-a), the groups $R^{35}$, $R^{36}$, $R^{37}$ and $R^{38}$ preferably each represent an alkyl group having 1 to 8 carbon atoms or an alkenyl group having 2 to 8 carbon atoms (wherein at least one methylene group within the alkyl group or the alkenyl group may be substituted with either —CO— group, or with oxygen atom or —COO— group, provided oxygen atoms are not bonded together directly), and even more preferably represent an alkyl group having 1 to 5 carbon atoms or an alkenyl group having 2 to 5 carbon atoms (wherein at least one methylene group within the alkyl group or the alkenyl group may be substituted with oxygen atoms, provided oxygen atoms are not bonded together directly).

The group $Z^{30}$ is preferably a single bond or a —COO— group, the groups $X^{33}$, $X^{34}$, $X^{35}$ and $X^{36}$ preferably each represent a hydrogen atom or a fluorine atom, and $A^{12}$ is preferably a 1,4-phenylene group or a 1,4-cyclohexylene group (wherein the 1,4-phenylene group may be either unsubstituted, or may be substituted with at least one fluorine atom, methyl group, or chlorine atom), and even more preferably a 1,4-cyclohexylene group. p is preferably 1.

Specific examples of particularly preferred compounds include the compounds represented by general formula (X-a) through general formula (X-e) shown below.

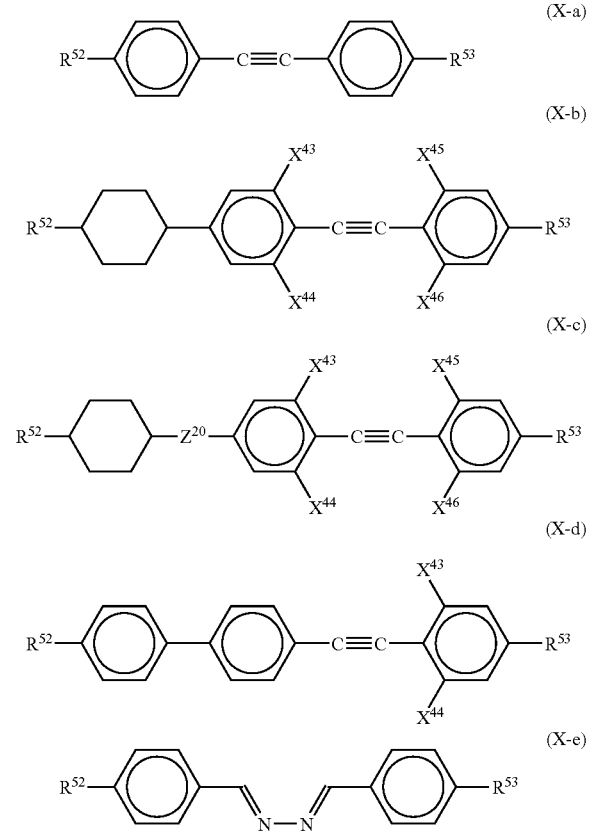

(wherein $R^{52}$ and $R^{53}$ each independently represent an alkyl group having 1 to 5 carbon atoms or an alkenyl group having 2 to 5 carbon atoms (wherein at least one methylene group within the group may be substituted with oxygen atoms, provided oxygen atoms are not bonded together directly), $Z^{20}$ represents a single bond or —COO—, and $X^{43}$, $X^{44}$, $X^{45}$ and $X^{46}$ each independently represent a hydrogen atom or a fluorine atom)

The compound represented by the general formula (I-b) preferably comprises 5 to 15% by weight, the group of compounds comprising the compounds represented by the general formula (II-d) and the general formula (II-e) preferably account for 3 to 15% by weight, and the group of compounds comprising the compounds represented by the general formula (IV-b), the general formula (III-a) and the general formula (V-a) preferably account for 50 to 80% by weight of a composition. Compositions in which the compound represented by the general formula (I-b) comprises 5 to 15% by weight, the group of compounds comprising the compounds represented by the general formula (II-d) and the general formula (II-e) account for 3 to 15% by weight, the compound represented by the general formula (IV-b) comprises 25 to 40% by weight, and the group of compounds represented by the general formula (III-a) and the general formula (V-a) comprises 25 to 40% by weight are even more desirable.

Because the HTP value of the compound represented by the general formula (I-b) is higher than the HTP values of the compounds represented by the general formula (II-d) or the general formula (II-e), of the potential combinations of compounds represented by the general formula (I-b) and either the general formula (II-d) or the general formula (II-e), aimed at reducing the temperature dependency of the natural pitch and the wavelength selective reflection, combinations in which the proportion of the compound represented by the general formula (I-b) is larger, enable greater reductions in the amount of optically active compounds that must be added in order to achieve the desired wavelength selective reflection. By using a compound represented by the general formula (IV-b) as a compound for reducing the driving voltage, combinations in which the proportion of the compound represented by the general formula (I-b) is large can be realized, enabling the amount of added optically active compound to be reduced even further. As a result, a composition with a broader liquid crystal temperature range, lower viscosity, and a more rapid response time can be produced.

The natural pitch of a chiral nematic liquid crystal composition of the present invention at 25° C. is preferably within a range from 0.1 to 3 μm, and even more preferably from 0.2 to 1 μm.

Furthermore, the parameter $\Delta W_{0-50}$, which is defined using the following formula, and represents the temperature dependency of the wavelength selective reflection across the temperature range from 0 to 50° C.:

$$\Delta W_{0-50} = \left| \frac{2(\lambda_{50} - \lambda_0)}{\lambda_{50} + \lambda_0} \times \frac{100}{50} \right|$$

(wherein $\lambda_0$ represents the wavelength selective reflection (nm) at 0° C., and $\lambda_{50}$ represents the wavelength selective reflection (nm) at 50° C.) is preferably no more than 0.05, and even more preferably no more than 0.03, and most preferably 0.01 or smaller.

Although a liquid crystal composition of the present invention can be used with any type of liquid crystal display element, it is particularly suited to use with bistable liquid crystal display elements. Bistable liquid crystal display elements using a liquid crystal composition according to the present invention have a broad operating temperature range, and show little variation in display quality upon variations in temperature.

EXAMPLES

As follows is a more detailed description of the present invention based on a series of examples, although the present invention is in no way restricted to the examples presented below. In the compositions of the examples and the comparative examples below, the units "%" refer to "% by weight".

Tni: Nematic phase-isotropic liquid phase transition temperature (° C.)

The parameter ΔW that represents the temperature dependency of the wavelength selective reflection is defined by the formula shown below.

$$\Delta W = \left| \frac{2(\lambda_b - \lambda_a)}{\lambda_a + \lambda_b} \times \frac{100}{b-a} \right|$$

(wherein λ represents the wavelength selective reflection (nm), and a, b represent temperatures (° C.), so that $\Delta W_{a-b}$ represents the parameter representing the temperature dependency of the wavelength selective reflection within a temperature range from a° C. to b° C., $\lambda_a$ represents the wavelength selective reflection at a° C., and $\lambda_b$ represents the wavelength selective reflection at b° C.)

Furthermore, the low temperature storage tests within the examples were conducted using a method wherein 0.5 g of a liquid crystal composition was placed in a test tube, the composition was degassed for 15 minutes and the atmosphere replaced with nitrogen, and the test tube was then sealed with a stopper. The test tubes containing the liquid crystal composition were then placed in different thermostatic chambers for 240 hours at −20° C., 0° C. or 15° C., and the compositions were then inspected to ascertain the state of the phases and detect the presence of any precipitation.

Example 1

As a sample of a liquid crystal composition, 1% of the compound represented by the formula (VI-e) was added to a liquid crystal composition (A) described below. The temperature characteristics of the pitch of this sample were then measured. These results were 5.2 μm at 0° C., 4.9 μm at 25° C., and 4.8 μm at 50° C. From these results it can be calculated that the HTP value for the compound (VI-e) is 19.2 at 0° C., 20.4 at 25° C., and 20.8 at 50° C., and that the temperature dependency of the pitch is negative. Furthermore using a contact method, the twist direction for the compound was confirmed as being clockwise. When the compound represented by the formula (VII-h) was added and measured in the same manner as described above, the pitch results were 11.7 μm at 0° C., 12.3 μm at 25° C., and 13.4 μm at 50° C. From these results it can be calculated that the HTP value for the compound (VII-h) is 8.5 at 0° C., 8.1 at 25° C., and 7.5 at 50° C. The temperature dependency of the pitch is positive. Furthermore using the contact method, the twist direction for the compound was confirmed as being clockwise, the same as that for the compound (VI-e).

(Composition A)

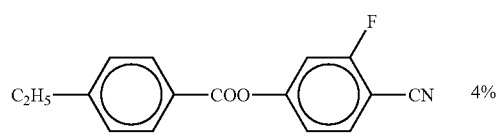

-continued

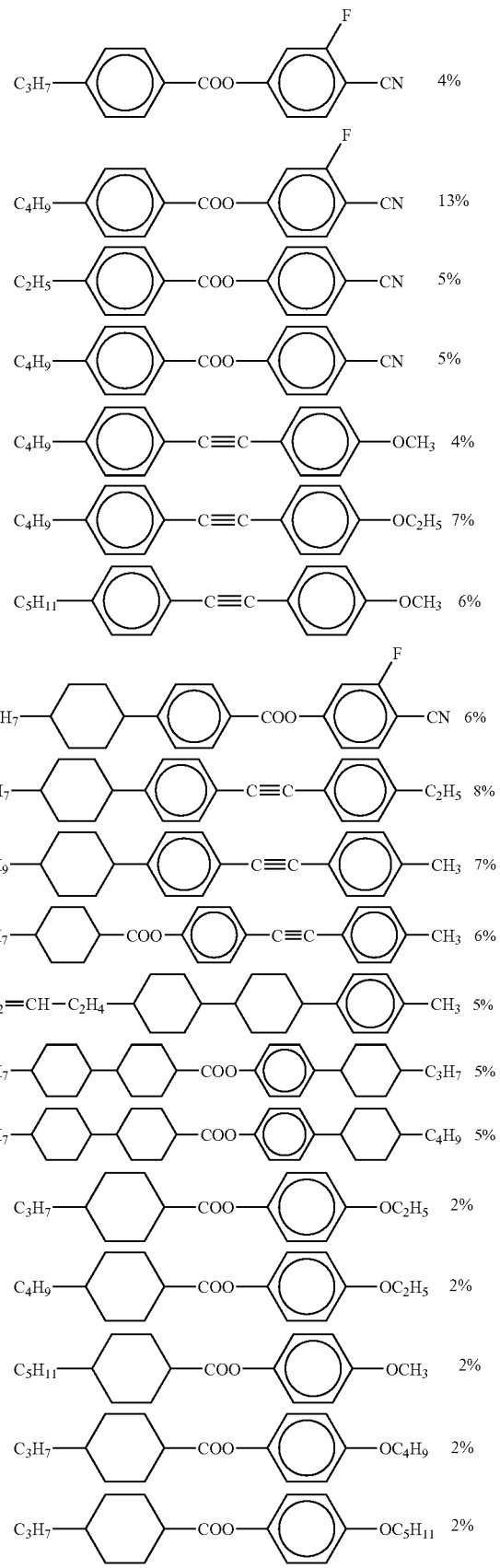

-continued

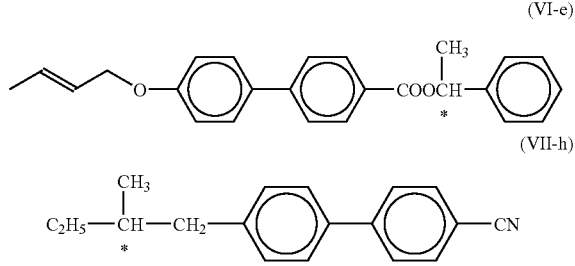

As a sample of the liquid crystal composition (B) 6.4% of the compound represented by the formula (VI-e) and 20.7% of the compound represented by the formula (VII-h) were added to a liquid crystal composition (A). The liquid crystal composition (B) was injected into a cell of thickness 5 μm, and subsequent measurement of the wavelength selective reflection revealed results of 563 nm at 0° C., 561 nm at 25° C., and 565 nm at 50° C. From these results, it can be calculated that the temperature dependency of the wavelength selective reflection for the temperature range from 0° C. to 50° C., namely $\Delta W_{0-50}$, is 0.0071, the temperature dependency of the wavelength selective reflection for the temperature range from 0° C. to 25° C., namely $\Delta W_{0-25}$, is −0.0142, and the temperature dependency of the wavelength selective reflection for the temperature range from 25° C. to 50° C., namely $\Delta W_{25-50}$, is 0.0284. Furthermore, the liquid crystal composition (B) showed a chiral nematic phase following low temperature storage tests at −20° C., 0° C. and 15° C.

Comparative Example 1

As a sample of the liquid crystal composition (C), 16.8% of the compound represented by the formula (VI-e) was added to a liquid crystal composition (A). The liquid crystal composition (C) was injected into a cell of thickness 5 μm, and subsequent measurement of the wavelength selective reflection revealed results of 780 nm at 0° C., 561 nm at 25° C., and 514 nm at 50° C. From these results, it can be calculated that $\Delta W_{0-50}$ is −0.8223, $\Delta W_{0-25}$ is −1.3065, and $\Delta W_{25-50}$ is −0.3498.

Comparative Example 2

As a sample of the liquid crystal composition (D), 38.5% of the compound represented by the formula (VII-h) was added to a liquid crystal composition (A). The liquid crystal composition (D) was injected into a cell of thickness 5 μm, and subsequent measurement of the wavelength selective reflection revealed results of 515 nm at 0° C., 565 nm at 25° C., and 605 nm at 50° C. From these results, it can be calculated that $\Delta W_{0-50}$ is 0.3214, $\Delta W_{0-25}$ is 0.3704, and $\Delta W_{25-50}$ is 0.2735.

Comparative Example 3

As a sample of the liquid crystal composition, 1% of the compound represented by the formula (II-b) was added to a liquid crystal composition (A). The temperature characteristics of the pitch were then measured. The results were 51 μm at 0° C., 42 μm at 25° C., and 39 μm at 50° C. From these results it can be calculated that the HTP value for the compound (III-b) is 2.0 at 0° C., 2.4 at 25° C., and 2.6 at 50° C., and that the temperature dependency of the pitch is negative. Furthermore using a contact method, the twist direction for the compound was confirmed as being clockwise. When 1% of the compound represented by the formula (VI-g) was added to a sample of the liquid crystal composition (A). The temperature characteristics of the pitch were then measured, the results were 8.9 μm at 0° C., 9.1 μm at 25° C., and 9.6 μm at 50° C. From these results it can be calculated that the HTP value for the compound (VI-g) is 11.2 at 0° C., 11.0 at 25° C., and 10.4 at 50° C., and that the temperature dependency of the pitch is positive. Furthermore using the contact method, the twist direction for the compound was confirmed as being clockwise.

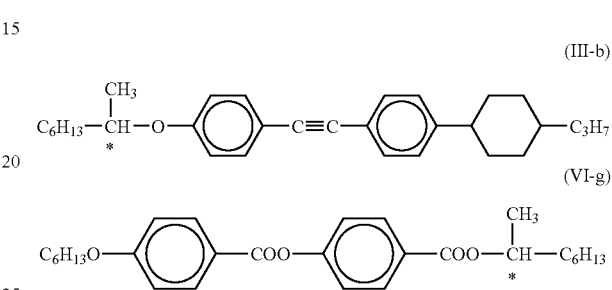

A liquid crystal composition (E) was prepared by adding 30% of the compound represented by the formula (III-b) and 23% of the compound represented by the formula (VI-g) to a sample of the liquid crystal composition (A), so as to achieve a wavelength selective reflection of 560 nm at 25° C., but the resulting composition did not show a liquid crystal phase at room temperature.

Comparative Example 4

As a sample of the liquid crystal composition (F), 3.2% of the compound represented by the formula (VI-c) and 27.9% of the compound represented by the formula (VI-g) were added to a liquid crystal composition (A). The liquid crystal composition (F) was injected into a cell of thickness 5 μm, and subsequent measurement of the wavelength selective reflection revealed results of 558 nm at 0° C., 561 nm at 25° C., and 580 nm at 50° C. From these results, it can be calculated that $\Delta W_{0-50}$ is 0.0808, $\Delta W_{0-25}$ is 0.0214, and $\Delta W_{25-50}$ is 0.1401. Furthermore, although the liquid crystal composition (F) showed a chiral nematic phase following low temperature storage tests at 15° C. and 0° C., in the low temperature storage test at −20° C., precipitation occurred.

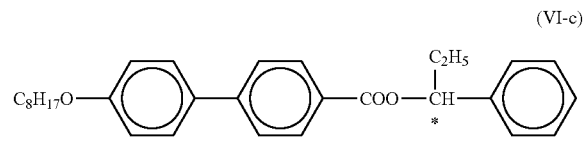

Example 2

As a sample of a liquid crystal composition (I), 11.2% of the compound represented by the formula (VI-e) and 4.8% of the compound represented by the formula (VII-h) were added to a liquid crystal composition (H). The liquid crystal composition (I) was injected into a cell of thickness 5 μm, and subsequent measurement of the wavelength selective reflection revealed results of 558 nm at 0° C., 560 nm at 25° C., and 560 nm at 50° C. From these results, it can be calculated that $\Delta W_{0-50}$ is 0.0072, $\Delta W_{0-25}$ is 0.0143, and $\Delta W_{25-50}$ is 0. Furthermore, the liquid crystal composition (I) showed a chiral nematic phase following the low temperature storage tests at −20° C., 0° C. and 15° C.

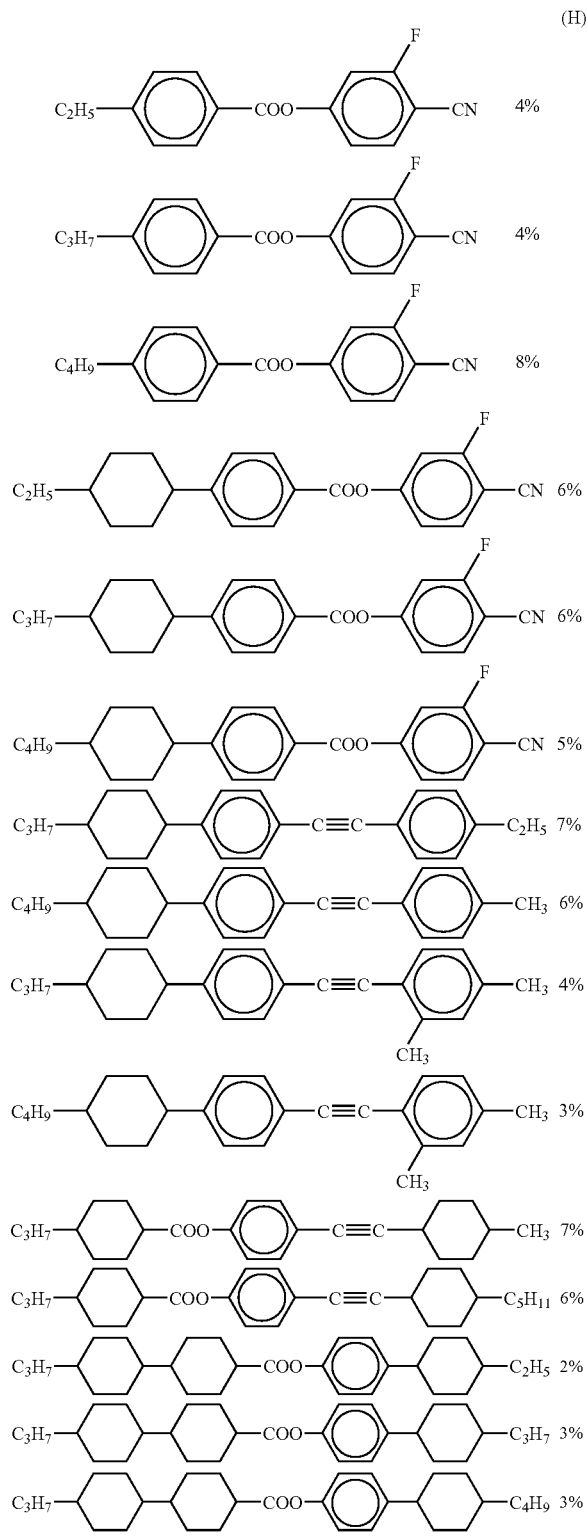

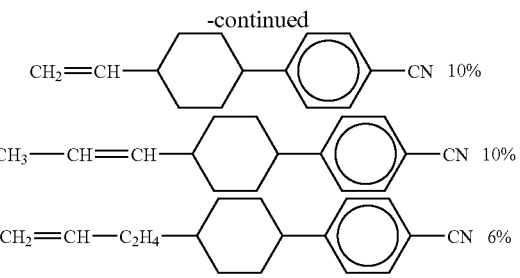

Example 3

As a sample of the liquid crystal composition (J), 8.5% of the compound represented by the formula (VI-e) and 8.5% of the compound represented by the formula (VI-g) were added to a liquid crystal composition (H). The liquid crystal composition (J) was injected into a cell of thickness 5 μm, and subsequent measurement of the wavelength selective reflection revealed results of 563 nm at 0° C., 561 nm at 25° C., and 561 nm at 50° C. From these results, it can be calculated that $\Delta W_{0-50}$ is −0.0071, $\Delta W_{0-25}$ is −0.0142, and $\Delta W_{25-50}$ is 0. Furthermore, the liquid crystal composition (J) showed a chiral nematic phase following the low temperature storage tests at −20° C., 0° C. and 15° C.

Comparative Example 5

As a sample of the liquid crystal composition (K), 10.26% of the compound represented by the formula (VI-f) and 0.54% of the compound represented by the formula (VI-g) were added to a liquid crystal composition (H). The liquid crystal composition (K) was injected into a cell of thickness 5 μM, and subsequent measurement of the wavelength selective reflection revealed results of 560 nm at 25° C., and 561 nm at 50° C. At 0° C., precipitation occurred and measurement proved impossible. The value of $\Delta W_{25-50}$ was 0.0071. Furthermore, in the low temperature storage tests using the liquid crystal composition (K) at −20° C., 0° C. and 15° C., precipitation occurred.

Comparative Example 6

As a sample of the liquid crystal composition (L), 5.0% of the compound represented by the formula (VI-f) and 5.0% of the compound represented by the formula (VI-g) were added to a liquid crystal composition (H). The liquid crystal composition (L) was injected into a cell of thickness 5 μm, and subsequent measurement of the wavelength selective reflection revealed results of 637 nm at 0° C., 665 nm at 25° C., and 671 nm at 50° C. From these results, it can be calculated that $\Delta W_{0-50}$ is 0.1040, $\Delta W_{0-25}$ is 0.1720, and $\Delta W_{25-50}$ is 0.0359. Furthermore, although the liquid crystal composition (L) showed a chiral nematic phase following the low temperature storage test at 15° C., in the low temperature storage tests at 0° C. and −20° C., precipitation occurred.

Example 4

As a sample of a liquid crystal composition (N), 8.3% of the compound represented by the formula (VI-e) and 8.3% of the compound represented by the formula (VI-g) were added to a liquid crystal composition (M) shown below. The liquid crystal composition (N) was injected into a cell of thickness 5 µm, and subsequent measurement of the wavelength selective reflection revealed results of 559 nm at 0° C., 560 nm at 25° C., and 560 nm at 50° C. From these results, it can be calculated that $\Delta W_{0-50}$ is 0.0036, $\Delta W_{0-25}$ is 0.0071, and $\Delta W_{25-50}$ is 0. Furthermore, the liquid crystal composition (N) showed a chiral nematic phase following the low temperature storage tests at −20° C., 0° C. and 15° C.

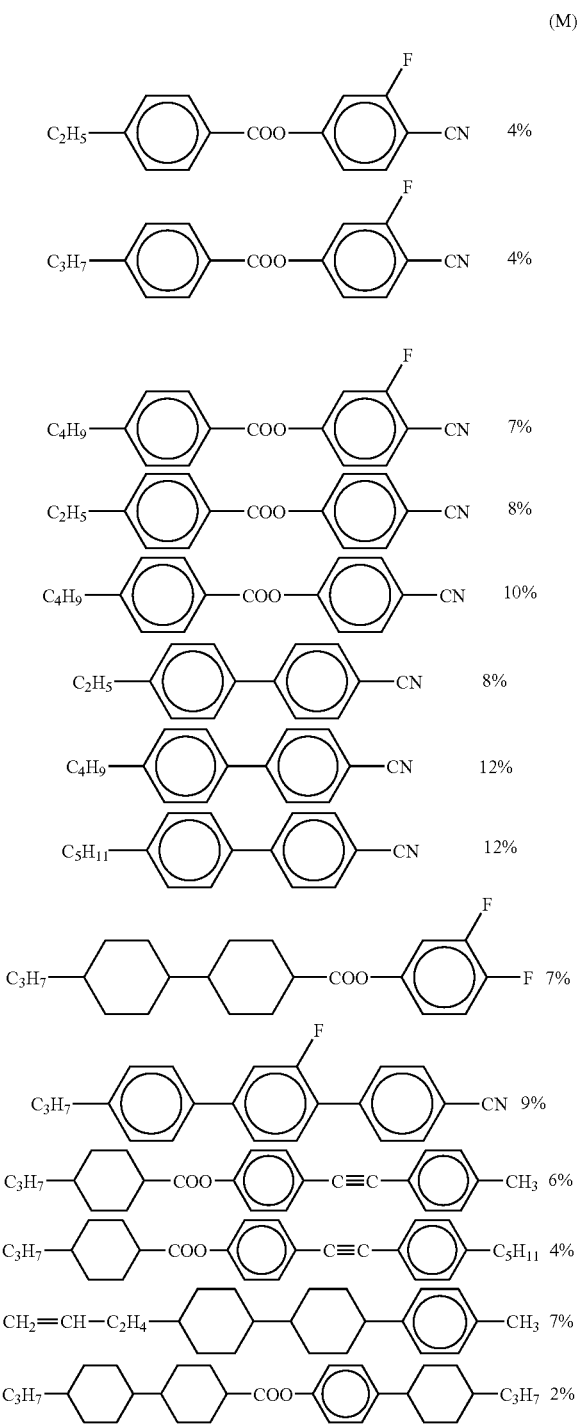

(M)

Example 5

As a sample of the liquid crystal composition (O), 11.2% of the compound represented by the formula (VI-e) and 4.8% of the compound represented by the formula (VII-h) were added to a liquid crystal composition (M). The liquid crystal composition (O) was injected into a cell of thickness 5 µm, and subsequent measurement of the wavelength selective reflection revealed results of 563 nm at 0° C., 560 nm at 25° C., and 562 nm at 50° C. From these results, it can be calculated that $\Delta W_{0-50}$ is −0.0036, $\Delta W_{0-25}$ is −0.0214, and $\Delta W_{25-50}$ is 0.0143. Furthermore, the liquid crystal composition (O) showed a chiral nematic phase following the low temperature storage tests at −20° C., 0° C. and 15° C.

Comparative Example 7

As a sample of the liquid crystal composition (P), 9.22% of the compound represented by the formula (VI-f) and 0.5% of the compound represented by the formula (VI-g) were added to a liquid crystal composition (M). The liquid crystal composition (P) was injected into a cell of thickness 5 µm, and subsequent measurement of the wavelength selective reflection revealed results of 560 nm at 25° C., and 565 nm at 50° C. At 0° C., precipitation occurred and measurement proved impossible. The value of $\Delta W_{25-50}$ was 0.0356. Furthermore, in the low temperature storage tests using the liquid crystal composition (P) at −20° C., 0° C. and 15° C., precipitation occurred.

Comparative Example 8

As a sample of the liquid crystal composition (Q), 5% of the compound represented by the formula (VI-f) and 5% of the compound represented by the formula (VI-g) were added to a liquid crystal composition (M). The liquid crystal composition (Q) was injected into a cell of thickness 5 µm, and subsequent measurement of the wavelength selective reflection revealed results of 637 nm at 0° C., 654 nm at 25° C., and 671 nm at 50° C. From these results, it can be calculated that $\Delta W_{0-50}$ is 0.1040, $\Delta W_{0-25}$ is 0.1053, and $\Delta W_{25-50}$ is 0.1026. Furthermore, although the liquid crystal composition (Q) showed a chiral nematic phase following the low temperature storage test at 15° C., in the low temperature storage tests at 0° C. and −20° C., precipitation occurred.

Example 6

As a sample of a liquid crystal composition (S), 11.25% of the compound represented by the formula (VI-e) and 8.5% of the compound represented by the formula (VII-h) were added to a liquid crystal composition (R) shown below. The liquid crystal composition (S) was injected into a cell of thickness 5 µm, and subsequent measurement of the wavelength selective reflection revealed results of 564 nm at 0° C., 562 nm at 25° C., and 562 nm at 50° C. From these results, it can be calculated that $\Delta W_{0-50}$ is −0.0071, $\Delta W_{0-25}$ is −0.0142, and $\Delta W_{25-50}$ is 0. Furthermore, the liquid crystal composition (S) showed a chiral nematic phase following the low temperature storage tests at −20° C., 0° C. and 15° C.

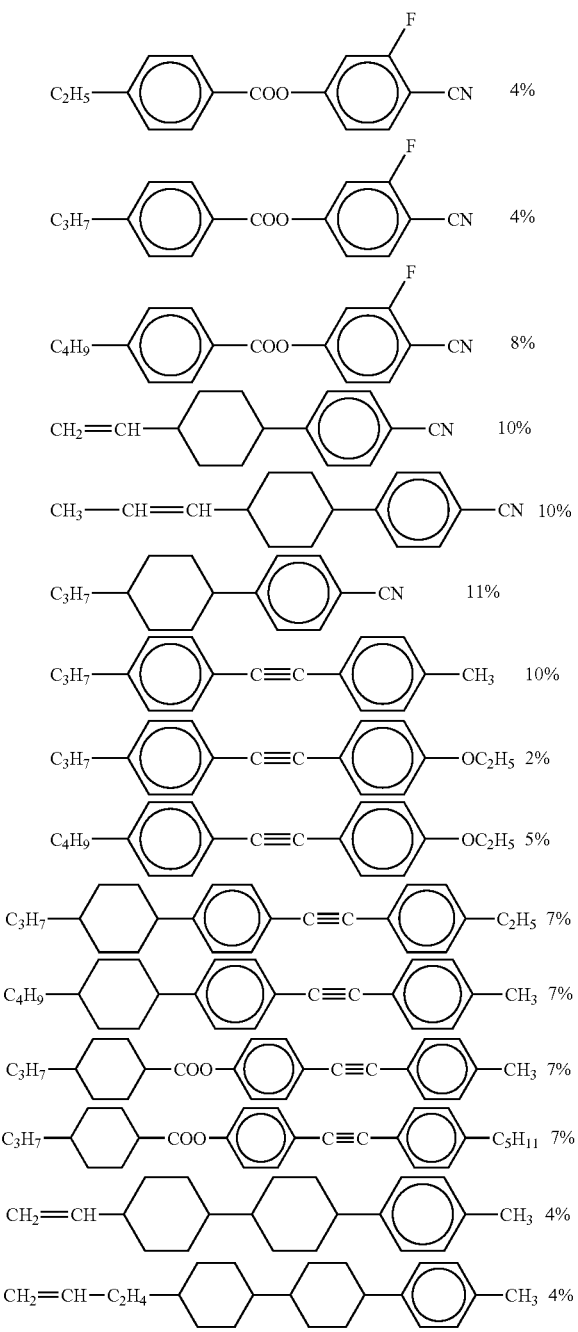

(R)

Comparative Example 9

As a sample of the liquid crystal composition (T), 6.98% of the compound represented by the formula (VI-f) and 4.65% of the compound represented by the formula (VI-g) were added to a liquid crystal composition (R). The liquid crystal composition (T) was injected into a cell of thickness 5 μm, and subsequent measurement of the wavelength selective reflection revealed results of 558 nm at 0° C., 559 nm at 25° C., and 552 nm at 50° C. From these results, it can be calculated that $\Delta W_{0\text{-}50}$ is −0.0216, $\Delta W_{0\text{-}25}$ is 0.0072, and $\Delta W_{25\text{-}50}$ is −0.0504. Furthermore, although the liquid crystal composition (T) showed a chiral nematic phase following the low temperature storage test at 15° C., in the low temperature storage tests at 0° C. and −20° C., precipitation occurred.

Example 7

As a sample of a liquid crystal composition (V), 10.87% of the compound represented by the formula (VI-e) and 7.88% of the compound represented by the formula (VII-h) were added to a liquid crystal composition (U) shown below. The liquid crystal composition (V) was injected into a cell of thickness 5 μm, and subsequent measurement of the wavelength selective reflection revealed results of 563 nm at 0° C., 562 nm at 25° C., and 563 nm at 50° C. From these results, it can be calculated that $\Delta W_{0\text{-}50}$ is 0, $\Delta W_{0\text{-}25}$ is −0.0071, and $\Delta W_{25\text{-}50}$ is 0.0071. Furthermore, the liquid crystal composition (V) showed a chiral nematic phase following the low temperature storage tests at −20° C., 0° C. and 15° C.

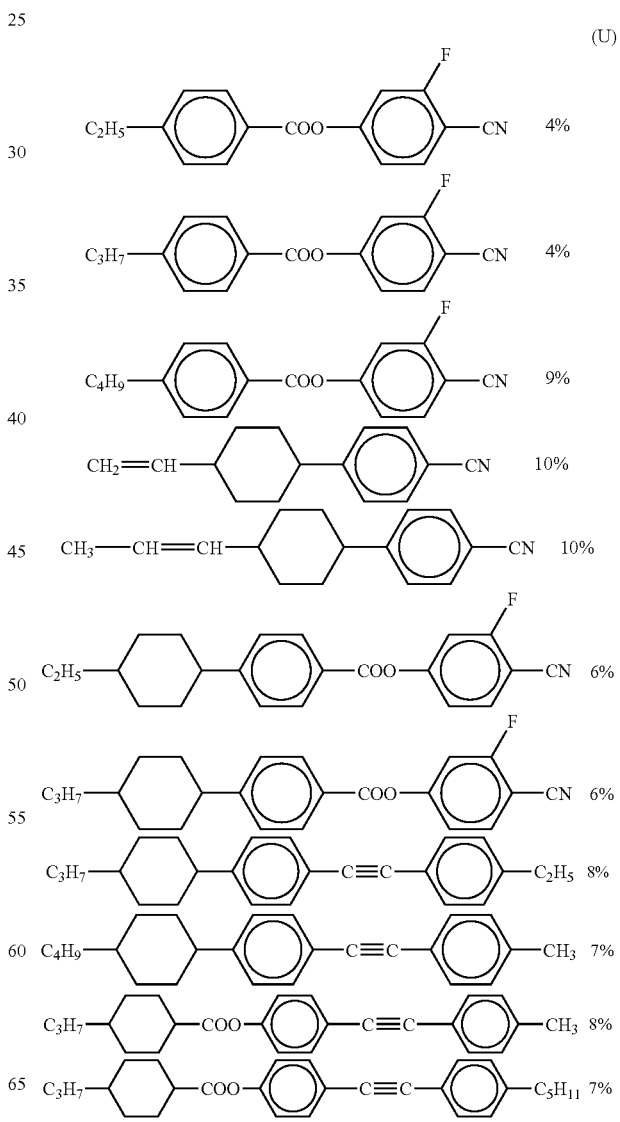

(U)

-continued

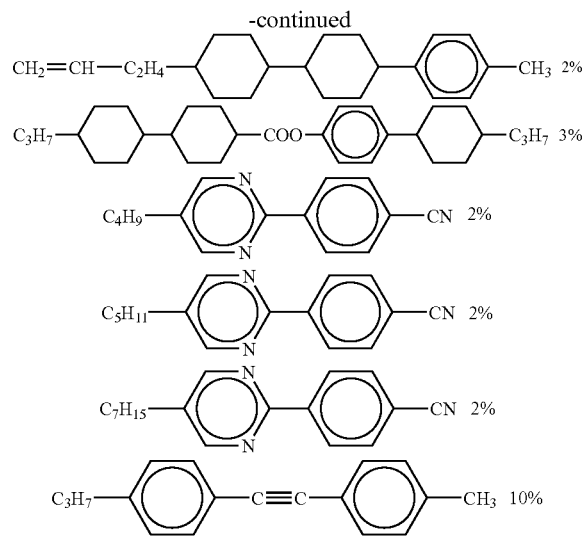

Comparative Example 10

As a sample of the liquid crystal composition (W), 7.32% of the compound represented by the formula (VI-f) and 3.69% of the compound represented by the formula (VI-g) were added to a liquid crystal composition (U). The liquid crystal composition (W) was injected into a cell of thickness 5 μm, and subsequent measurement of the wavelength selective reflection revealed results of 559 nm at 0° C., 560 nm at 25° C., and 561 nm at 50° C. From these results, it can be calculated that $\Delta W_{0-50}$ is 0.0071, $\Delta W_{0-25}$ is 0.0071, and $\Delta W_{25-50}$ is 0.0071. Furthermore, although the liquid crystal composition (W) showed a chiral nematic phase following the low temperature storage test at 15° C., in the low temperature storage tests at 0° C. and −20° C., precipitation occurred.

Example 8

As a sample of a liquid crystal composition (AB), 11.1% of the compound represented by the formula (VI-e) and 8.9% of the compound represented by the formula (VII-h) were added to a liquid crystal composition (AA) shown below. The liquid crystal composition (AB) was injected into a cell of thickness 5 μm, and subsequent measurement of the wavelength selective reflection revealed results of 561 nm at 0° C., 560 nm at 25° C. and 562 nm at 50° C. From these results, it can be calculated that $\Delta W_{0-50}$ is 0.0036, $\Delta W_{0-25}$ is −0.0071, and $\Delta W_{25-50}$ is 0.0143. Furthermore, the liquid crystal composition (AB) showed a chiral nematic phase following the low temperature storage tests at −20° C., 0° C. and 15° C.

(AA)

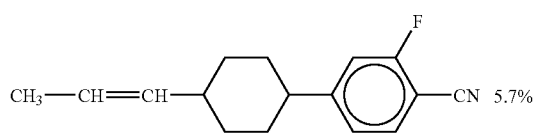

-continued

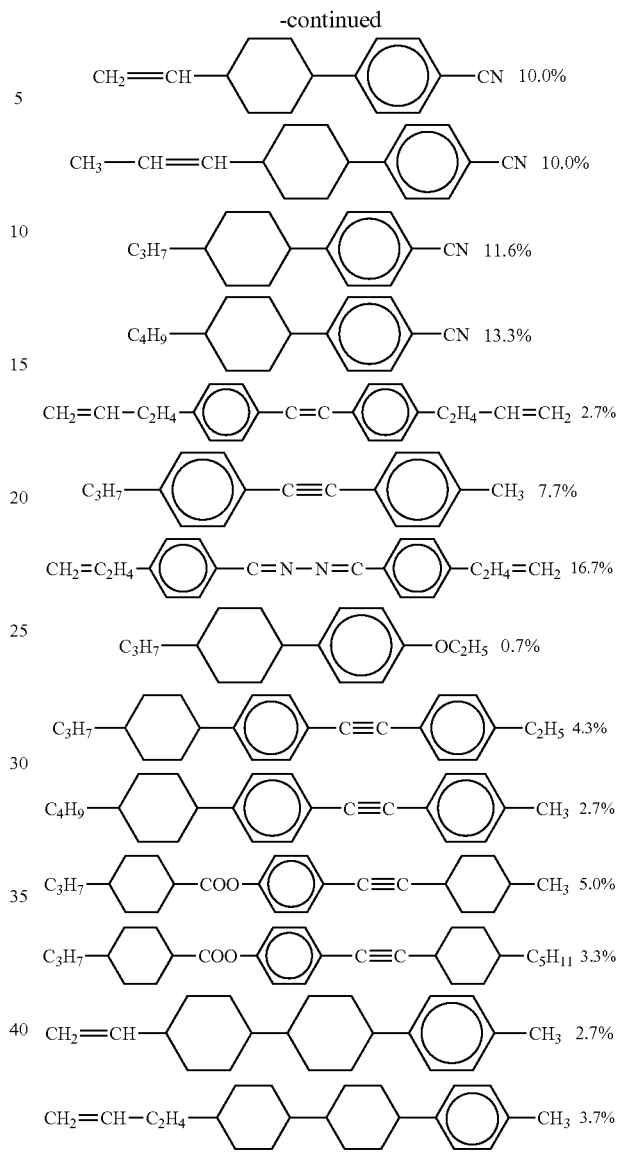

Comparative Example 11

As a sample of the liquid crystal composition (AC), 6.3% of the compound represented by the formula (VI-f) and 6.2% of the compound represented by the formula (VI-g) were added to a liquid crystal composition (AA). The liquid crystal composition (AC) was injected into a cell of thickness 5 μm, and subsequent measurement of the wavelength selective reflection revealed results of 558 nm at 0° C., 561 nm at 25° C., and 562 nm at 50° C. From these results, it can be calculated that $\Delta W_{0-50}$ is 0.0143, $\Delta W_{0-25}$ is 0.0214, and $\Delta W_{25-50}$ is 0.0071. Furthermore, although the liquid crystal composition (AC) showed a chiral nematic phase following the low temperature storage test at 15° C., in the low temperature storage tests at 0° C. and −20° C., precipitation occurred.

The characteristics of each of the liquid crystal compositions are summarized in Table 1.

TABLE 1

| Name of liquid crystal composition | Host liquid crystal composition | Chiral compound (First component) | Chiral compound (Second component) | $\Delta W_{0-50}$ | −20° C. low temperature storage test |
|---|---|---|---|---|---|
| Example 1 | B | A | VI-e | VII-h | 0.0071 | ○ |
| Comparative example 1 | C | A | VI-e | | −0.8223 | ○ |
| Comparative example 2 | D | A | | VII-h | 0.3214 | ○ |
| Comparative example 3 | E | A | III-b | VI-g | — | X |
| Comparative example 4 | F | A | VI-c | VI-g | 0.0808 | X |
| Example 2 | I | H | VI-e | VII-h | 0.0072 | ○ |
| Example 3 | J | H | VI-e | VI-g | −0.0071 | ○ |
| Comparative example 5 | K | H | VI-f | VI-g | —* | X |
| Comparative example 6 | L | H | VI-f | VI-g | 0.1040 | X |
| Example 4 | N | M | VI-e | VI-g | 0.0036 | ○ |
| Comparative example 7 | P | M | VI-f | VI-g | —* | X |
| Comparative example 8 | Q | M | VI-f | VI-g | 0.1040 | X |
| Example 6 | S | R | VI-e | VII-h | −0.0071 | ○ |
| Comparative example 9 | T | R | VI-f | VI-g | −0.0216 | X |
| Example 7 | V | U | VI-e | VII-h | 0.0000 | ○ |
| Comparative example 10 | W | U | VI-f | VI-g | 0.0071 | X |
| Example 8 | AB | AA | VI-e | VII-h | 0.0036 | ○ |
| Comparative example 11 | AC | AA | VI-f | VI-g | 0.0143 | X |

(For the −20° C. low temperature storage test results shown in Table 1, the symbol O represents a chiral nematic phase following the test, and the symbol X represents the occurrence of precipitation following the storage test. In the comparative example 5 and the comparative example 7, the symbol * indicates that because measurement of the wavelength selective reflection was not possible at 0° C., a value for $\Delta W_{0-50}$ could not be calculated. The host liquid crystal composition represents the composition prior to addition of the optically active compounds.)

From the above results it is evident that the compositions of the examples show a smaller wavelength selective reflection temperature dependency than the liquid crystal compositions of the comparative examples 1, 2, 3, 6 and 8, and furthermore, that the liquid crystal compositions of the examples show a superior low temperature storage stability when compared with the liquid crystal compositions of the comparative examples 3 through 11.

Example 9

As a sample of a liquid crystal composition (AE), 11.2% of the compound represented by the formula (VI-e) and 4.8% of the compound represented by the formula (VII-h) were added to a liquid crystal composition (AD) shown below. The liquid crystal composition (AE) was injected into a cell of thickness 5 μm, and subsequent measurement of the wavelength selective reflection revealed results of 563 nm at 0° C., 560 nm at 25° C., and 566 nm at 50° C. From these results, it can be calculated that $\Delta W_{0-50}$ is 0.0106, $\Delta W_{0-25}$ is −0.0214, and $\Delta W_{25-50}$ is 0.0426. Furthermore, the liquid crystal composition (AE) showed a chiral nematic phase following the low temperature storage tests at −20° C., 0° C. and 15° C., and the transition temperature (Tni) was 81.3° C.

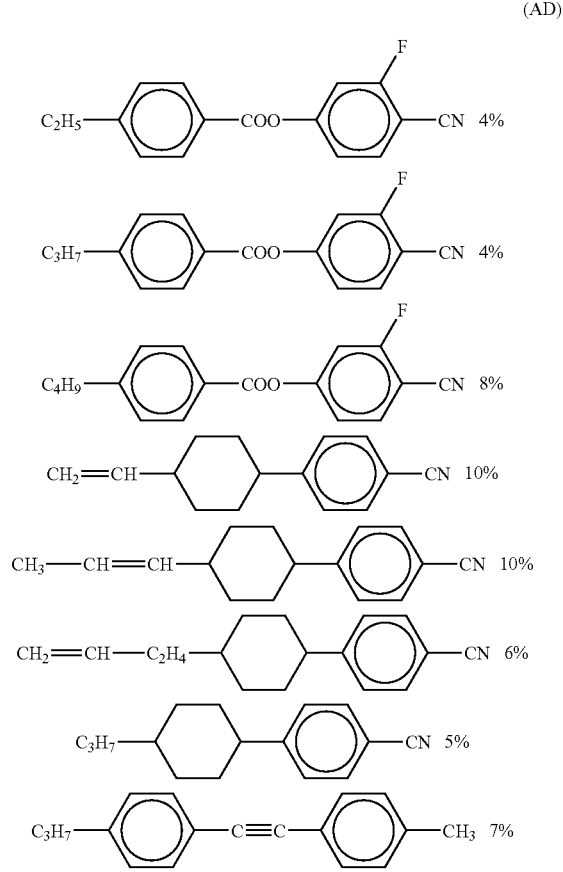

(AD)

-continued

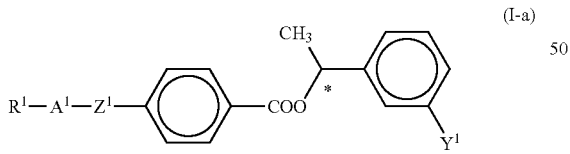

Example 10

When the transition temperature (Tni) for the liquid crystal composition (V) of the example 7 was measured, Tni was 76.6° C.

From the above results it is evident that the liquid crystal compositions described in the examples 9 and 10 are chiral nematic liquid crystals that show a small wavelength selective reflection temperature dependency, and moreover also offer a broad liquid crystal temperature range extending from at least 70° C. to less than −20° C.

What is claimed is:

1. A chiral nematic liquid crystal composition comprising:
at least one optically active compound represented by general formula (I-a):

(I-a)

wherein * indicates a position of an asymmetric carbon atom;
$R^1$ represents an alkyl group having 1 to 10 carbon atoms, an alkenyl group having 2 to 10 carbon atoms, a fluorine atom, a chlorine atom, a bromine atom, an iodine atom, a cyano group, or an isothiocyanate group, said alkyl group or said alkenyl group being either unsubstituted or substituted with at least one fluorine atom, chlorine atom, cyano group, methyl group or trifluoromethyl group, and at least one methylene group within said alkyl group or said alkenyl group may be substituted with either —CO— group, or with oxygen atom or —COO— group, provided oxygen atoms are not bonded together directly;
$A^1$ represents a 1,4-phenylene group, 1,4-cyclohexylene group, 1,4-cyclohexenylene group, tetrahydropyran-2,5-diyl group, 1,3-dioxane-2,5-diyl group, tetrahydrothiopyran-2,5-diyl group, 1,4-bicyclo[2,2,2]octylene group, decahydronapthalene-2,6-diyl group, pyridine-2,5-diyl group, pyrimidine-2,5-diyl group, pyrazine-2,5-diyl group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, or fluorene-2,7-diyl group, and said 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a, 9,10a-octahydrophenanthrene-2,7-diyl group, or fluorene-2,7-diyl group is either unsubstituted or is substituted with at least one fluorine atom, chlorine atom, trifluoromethyl group, trifluoromethoxy group, or methyl group;
$Z^1$ represents a single bond, or —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$—, or —CH$_2$CH=CHCH$_2$—; and
$Y_1$ represents a hydrogen atom, an alkyl group having 1 to 10 carbon atoms, an alkenyl group having 2 to 10 carbon atoms, a fluorine atom, a chlorine atom, a bromine atom, an iodine atom, a cyano group, or an isothiocyanate group, said alkyl group or said alkenyl group being either unsubstituted or substituted with at least one fluorine atom, chlorine atom, cyano group, methyl group or trifluoromethyl group, and at least one methylene group within said alkyl group or said alkenyl group may be substituted with either —CO— groups, or with oxygen atoms or —COO— groups provided oxygen atoms are not bonded together directly, and
wherein the natural pitch induced upon addition of the compound represented by general formula (I-a) to a nematic liquid crystal decreases with increasing temperature; and
at least one optically active compound represented by general formula (II-a):

$$R^2\text{-}(P^1\text{-}L^1)_S\text{-}P^2\text{-}L^2\text{-}P^3\text{-}R^3 \quad \text{(II-a)}$$

wherein $R^2$ and $R^3$ each independently represent a hydrogen atom, a fluorine atom, a chlorine atom, a bromine atom, an iodine atom, a cyano group, a phenyl group, an alkyl group having 1 to 10 carbon atoms, or an alkenyl group having 2 to 10 carbon atoms, said alkyl group or said alkenyl group being either unsubstituted or substituted with at least one fluorine atom, chlorine atom, cyano group, methyl group or trifluoromethyl group, and at least one methylene group within said alkyl group or said alkenyl group may be substituted with either —CO— group, or with oxygen atom or —COO— group, provided oxygen atoms are not bonded together directly;
The meaning of each of $P^1$ and $P^2$ independently is the same as that of said group $A^1$ in general formula (I-a);
The meaning of $P^3$ is the same as that of said group $A^1$ in general formula (I-a), or $P^3$ represents a 1,3-phenylene group, and said 1,3-phenylene group is either unsubstituted or is substituted with at least one fluorine atom, chlorine atom, trifluoromethyl group, trifluoromethoxy group, or methyl group;

$L^1$ and $L^2$ each independently represent a single bond, or —CO—, —COO—, —OCO—, —C≡C—, —CH$_2$CH$_2$—, —CH$_2$CH$_2$CH$_2$—, —CH$_2$CH$_2$CH$_2$CH$_2$—, —CH$_2$COO—, —CH$_2$OCO—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$—, —CH$_2$CH=CHCH$_2$—, or —COOCH$_2$CH$_2$OCO—, and a hydrogen atom of a C—H linkage in —CH$_2$CH$_2$—, —CH$_2$CH$_2$CH$_2$—, —CH$_2$CH$_2$CH$_2$CH$_2$—, —CH$_2$COO—, —CH$_2$OCO—, —CH$_2$O—, —CH$_2$CH$_2$CH=CH—, —CH=CHCH$_2$CH$_2$—, or —COOCH$_2$CH$_2$OCO— may be substituted with an alkyl group having 1 to 5 carbon atoms in which at least one hydrogen atom in said alkyl group may be substituted with a fluorine atom, or a phenyl group; and s represents 0, 1, or 2, and in a case in which s=2, a plurality of $P^1$ and $L^1$ groups represent either identical groups or different groups, although at least one of $R^2$, $R^3$, $L^1$ and $L^2$ must be an optically active group, with an identical helical twisting direction to said compound represented by general formula (I-a), a helical twisting power; HTP in 1/μm, as represented by a formula shown below, $$HTP=1/(P\times 0.01C)$$

wherein C represents an amount of added optically active compound in weight %, and P represents a natural pitch in μm of at least 3, and wherein the natural pitch induced upon addition of the compound represented by general formula (II-a) to a nematic liquid crystal increases with increasing temperature.

2. A chiral nematic liquid crystal composition according to claim 1, wherein in general formula (I-a):

$R^1$ represents an alkyl group having 1 to 10 carbon atoms or an alkenyl group having 2 to 10 carbon atoms, said alkyl group or said alkenyl group being either unsubstituted or substituted with at least one fluorine atom, trifluoromethyl group, or methyl group, and at least one methylene group within said alkyl group or said alkenyl group may be substituted with either —CO— group, or with oxygen atom or —COO— group, provided oxygen atoms are not bonded together directly, $A^1$ represents a 1,4-phenylene group or a 1,4-cyclohexylene group, $Z^1$ represents a single bond, or —COO—, —OCO—, —C≡C—, or —CH$_2$CH$_2$—, and $Y_1$ represents a hydrogen atom, a fluorine atom, a chlorine atom, a bromine atom, an iodine atom, an alkyl group having 1 to 3 carbon atoms, or an alkenyl group having 2 to 3 carbon atoms, said alkyl group or said alkenyl group being either unsubstituted or substituted with at least one fluorine atom, and at least one methylene group within said alkyl group or said alkenyl group may be substituted with either —CO— group, or with oxygen atom or —COO— group, provided oxygen atoms are not bonded together directly.

3. A chiral nematic liquid crystal composition according to claim 1, comprising at least one compound selected from a group consisting of compound represented by general formula (II-1), general formula (II-2) and general formula (II-3):

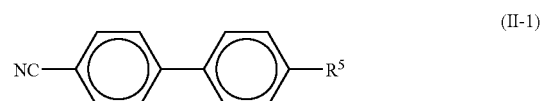
(II-1)

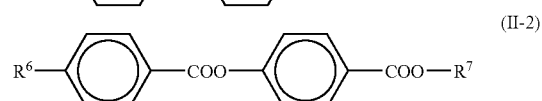
(II-2)

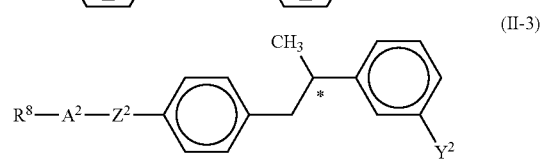
(II-3)

wherein $R^5$ represents an alkyl group having 1 to 10 carbon atoms or an alkenyl group having 2 to 10 carbon atoms, said alkyl group or said alkenyl group being either unsubstituted or substituted with at least one fluorine atom, chlorine atom, trifluoromethyl group or methyl group, at least one methylene group within said alkyl group or said alkenyl group may be substituted with either —CO— group, or with oxygen atom or —COO— group, provided oxygen atoms are not bonded together directly, and said alkyl group or said alkenyl group has at least one asymmetric carbon atom;

$R^6$ and $R^7$ each independently represent a fluorine atom, a chlorine atom, a bromine atom, an iodine atom, a cyano group, an alkyl group having 1 to 10 carbon atoms, or an alkenyl group having 2 to 10 carbon atoms, said alkyl group or said alkenyl group being either unsubstituted or substituted with at least one fluorine atom, chlorine atom, trifluoromethyl group or methyl group, at least one methylene group within said alkyl group or said alkenyl group may be substituted with either —CO— group, or with oxygen atom or —COO— group, provided oxygen atoms are not bonded together directly, and at least one of $R^6$ and $R^7$ contains at least one asymmetric carbon atom;

*represents a position of an asymmetric carbon atom;

$R^8$ represents a fluorine atom, a chlorine atom, a bromine atom, an iodine atom, a cyano group, an alkyl group having 1 to 10 carbon atoms, or an alkenyl group having 2 to 10 carbon atoms, said alkyl group or said alkenyl group being either unsubstituted or substituted with at least one fluorine atom, chlorine atom, trifluoromethyl group or methyl group, and at least one methylene group within said alkyl group or said alkenyl group may be substituted with either —CO— group, or with oxygen atom or —COO— group, provided oxygen atoms are not bonded together directly;

$Z^2$ represents a single bond, or —CO—, —COO—, —OCO—, —CH=N, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, CF=CF—, —CH=CH—, —CH$_2$CH$_2$CH=CH—, —CH=CHCH$_2$CH$_2$—, or —CH$_2$CH=CHCH$_2$—;

$A^2$ represents a 1,4-phenylene group, 1,4-cyclohexylene group, 1,4-cyclohexenylene group, tetrahydropyran-2,5-diyl group, 1,3-dioxane-2,5-diyl group, tetrahydrothiopyran-2,5-diyl group, 1,4-bicyclo[2,2,2]octylene group, decahydronapthalene-2,6-diyl group, pyridine-2,5-diyl group, pyrimidine-2,5-diyl group, pyrazine-2,5-diyl group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2, 7-diyl group, or fluorene-2,7-diyl group, and said 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, or fluorene-2,7-diyl group is either unsubstituted or is substituted with at least one fluorine atom, chlorine atom, trifluoromethyl group, trifluoromethoxy group, or methyl group; and $Y^2$ represents a hydrogen atom, an alkyl group having 1 to 3 carbon atoms, an alkenyl group having 2 to 3 carbon atoms, a fluorine atom, a chlorine atom, a bromine atom, or an iodine atom, said alkyl group or said alkenyl group being either unsubstituted or substituted with at least one fluorine atom, chlorine atom, trifluoromethyl group, cyano group or methyl group, and at least one methylene group within said alkyl group or said alkenyl group may be substituted with either —CO— group, or with oxygen atom or —COO— group, provided oxygen atoms are not bonded together directly.

4. A chiral nematic liquid crystal composition according to claim 3, wherein in general formula (I-a):

$R^1$ represents an alkyl group having 1 to 10 carbon atoms or an alkenyl group having 2 to 10 carbon atoms, said alkyl group or said alkenyl group being either unsubstituted or substituted with at least one fluorine atom, trifluoromethyl group, or methyl group, and at least one methylene group within said alkyl group or said alkenyl group may be substituted with either —CO— group, or with oxygen atom or —COO— group, provided oxygen atoms are not bonded together directly, $A^1$ represents a 1,4-phenylene group or a 1,4-cyclohexylene group, $Z^1$ represents a single bond, or —COO—, —OCO—, —C≡C—, or —CH$_2$CH$_2$—, and $Y_1$ represents a hydrogen atom, a fluorine atom, a chlorine atom, a bromine atom, an iodine atom, an alkyl group having 1 to 3 carbon atoms, or an alkenyl group having 2 to 3 carbon atoms, said alkyl group or said alkenyl group being either unsubstituted or substituted with at least one fluorine atom, and at least one methylene group within said alkyl group or said alkenyl group may be substituted with either —CO— group, or with oxygen atom or —COO— group, provided oxygen atoms are not bonded together directly.

5. A chiral nematic liquid crystal composition according to claim 3, further comprising at least one compound represented by general formula (IV):

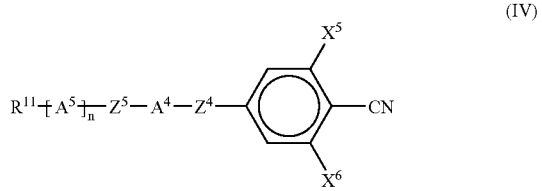

(IV)

wherein $R^{11}$ represents an alkyl group having 1 to 10 carbon atoms, or an alkenyl group having 2 to 10 carbon atoms, said alkyl group or said alkenyl group being either unsubstituted or substituted with at least one fluorine atom, chlorine atom, trifluoromethyl group, cyano group or methyl group, and at least one methylene group within said alkyl group or said alkenyl group may be substituted with either —CO— group, or with oxygen atom or —COO— group, provided oxygen atoms are not bonded together directly;

$Z^4$ $Z^5$ independently represent a single bond, or —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —CF$_2$O—, —OCF$_2$—, —CH=N—N=CH—, —CF=CF—, —CH=CH—, —CH$_2$CH$_2$CH=CH—, —CH=CHCH$_2$CH$_2$—, or —CH$_2$CH=CHCH$_2$—; CHCH$_2$—;

$A^4$ and $A^5$ each independently represent a 1,4-phenylene group, a 1,4-cyclohexylene group or a pyrimidine-2,5-diyl group, and said 1,4-phenylene group is either unsubstituted or is substituted with at least one fluorine atom, chlorine atom, trifluoromethyl group, trifluoromethoxy group or methyl group;

$X^5$ and $X^6$ each independently represent a hydrogen atom, a fluorine atom or a chlorine atom; and n represents either 0 or 1.

6. A chiral nematic liquid crystal composition according to claim 3, further comprising at least one compound selected from a group consisting of compounds represented by general formula (III) and general formula (V):

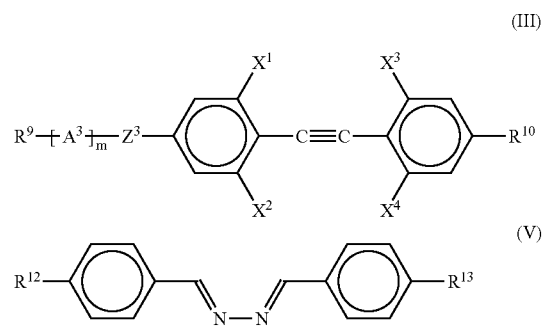

wherein $R^9$, $R^{10}$, $R^{12}$ and $R^{13}$ each independently represent an alkyl group having 1 to 10 carbon atoms, or an alkenyl group having 2 to 10 carbon atoms, said alkyl group or said alkenyl group being either unsubstituted or substituted with at least one fluorine atom, chlorine atom, trifluoromethyl group or methyl group, and at least one methylene group within said alkyl group or said alkenyl group may be substituted with either —CO— group, or with oxygen atom or —COO— group, provided oxygen atoms are not bonded together directly;

$Z^3$ represents a single bond, or —CO—, —COO—, —OCO—, —CH=N—, —N=CH—, —C≡C—, —CH$_2$CH$_2$—, —CH$_2$CH$_2$CH$_2$—, —CH$_2$CH$_2$CH$_2$CH$_2$—, —CH$_2$O—, —OCH$_2$—, —OCF$_2$—, —CH=N—N=CH—, —CF=CF—, —CH=CH—, —CH$_2$CH$_2$CH=CH—, —CH=CHCH$_2$CH$_2$—, or —CH$_2$CH=CHCH$_2$—;

$A^3$ represents a 1,4-phenylene group or a 1,4-cyclohexylene group, and said 1,4-phenylene group is either unsubstituted or is substituted with at least one fluorine atom, chlorine atom, trifluoromethyl group, trifluoromethoxy group or methyl group;

$X^1$, $X^2$, $X^3$ and $X^4$ each independently represent a hydrogen atom, a fluorine atom, a chlorine atom or a methyl group; and m represents either 0 or 1.

7. A chiral nematic liquid crystal composition according to claim 3 wherein a compound represented by general formula (I-a) comprises 3 to 20% by weight, and a group of compounds represented by general formula (II-1), general formula (II-2) and general formula (II-3) comprises 3 to 30% by weight, and a natural pitch at 25° C. is within a range from 0.1 to 3 μm.

8. A chiral nematic liquid crystal composition according to claim 5, wherein a compound represented by general formula (I-a) comprises 3 to 20% by weight, a group of compounds represented by general formula (II-1), general formula (II-2) and general formula (II-3) comprises 3 to 30% by weight, and a compound represented by general formula (IV) comprises 0 to 65% by weight, and a natural pitch at 25° C. is within a range from 0.1 to 3 μm.

9. A chiral nematic liquid crystal composition according to claim 6, wherein a compound represented by general formula (I-a) comprises 3 to 20% by weight, a group of compounds represented by general formula (II-1), general formula (II-2) and general formula (II-3) comprises 3 to 30% by weight, and a group of compounds represented by general formula (III) and general formula (V) comprises 5 to 60% by weight, and a natural pitch at 25° C. is within a range from 0.1 to 3 μm.

10. A chiral nematic liquid crystal composition according to claim 1 comprising:
from 5 to 15% by weight of at least one optically active compound represented by general formula (I-b):

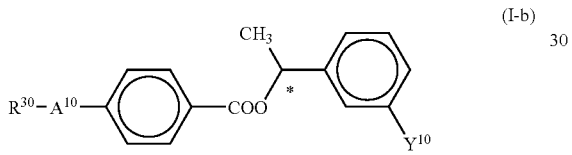

wherein $R^{30}$ represents an alkyl group having 1 to 10 carbon atoms or an alkenyl group having 2 to 10 carbon atoms, said alkyl group or said alkenyl group being either unsubstituted or substituted at least one fluorine atom, trifluoromethyl group, or methyl, and at least one methylene group within said alkyl group or said alkenyl group may be substituted with either —CO— group, or with oxygen atom or —COO— group, provided oxygen atoms are not bonded together directly;

* represents a position of an asymmetric carbon atom;
$A^{10}$ represents a 1,4-phenylene group or a 1,4-cyclohexylene group; and
$Y^{10}$ represents a hydrogen atom, a trifluoromethyl group, a trifluoromethoxy group, a methoxy group, or a methyl group, from 3 to 15% by weight of at least one compound selected from a group consisting of optically active compound represented by general formula (II-d) and general formula (II-e)

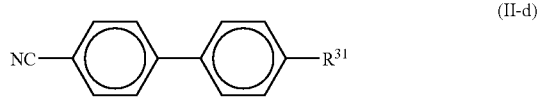

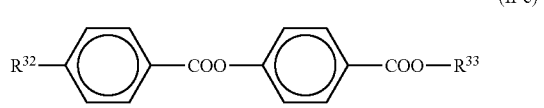

(wherein $R^{31}$, $R^{32}$ and $R^{33}$ each independently represent an alkyl group having 1 to 10 carbon atoms or an alkenyl group having 2 to 10 carbon atoms, said alkyl group or said alkenyl group being either unsubstituted or substituted with at least one fluorine atom, trifluoromethyl group, or methyl group, although $R^{31}$ and $R^{33}$ must have at least one asymmetric carbon atom, and at least one methylene group within said alkyl group or said alkenyl group may be substituted with either —CO— group, or with oxygen atom or —COO— group, provided oxygen atoms are not bonded together directly, with an identical helical twisting direction to said compound represented by general formula (I-b), and for which a natural pitch that is induced upon addition to a nematic liquid crystal increases with rising temperature, and from 20 to 50% by weight of at least one compound represented by general formula (IV-b):

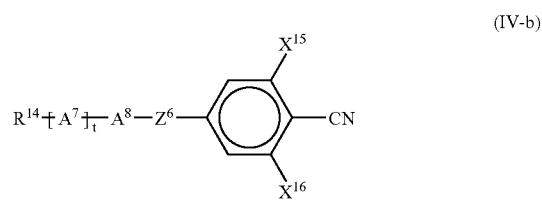

wherein $R^{14}$ represents an alkyl group having 1 to 10 carbon atoms or an alkenyl group having 2 to 10 carbon atoms, and at least one methylene group within said alkyl group or said alkenyl group may be substituted with oxygen atoms, provided oxygen atoms are not bonded together directly;
$A^7$ and $A^8$ each independently represents a 1,4-phenylene group, a 1,4-cyclohexylene group or a pyrimidine-2,5-diyl group, and said 1,4-phenylene group is either unsubstituted or is substituted with at least one fluorine atom or chlorine atom;
$Z^6$ represents a single bond, —COO— or —CH$_2$CH$_2$—;
$X^{15}$ and $X^{16}$ each independently represent a hydrogen atom, a fluorine atom, or a chlorine atom; and
t represents either 0 or 1, although if t=0 then $Z^6$ a single bond.

11. A chiral nematic liquid crystal composition according to claim 10, further comprising a compound represented by general formula (IV-a):

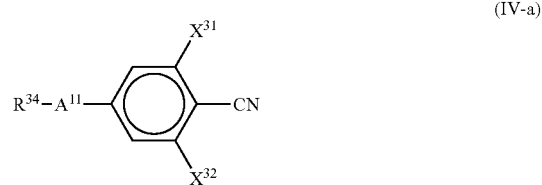

wherein $R^{34}$ represents an alkyl group having 1 to 10 carbon atoms or an alkenyl group having 2 to 10 carbon atoms, and at least one methylene group within said alkyl group or said alkenyl group may be substituted with oxygen atoms, provided oxygen atoms are not bonded together directly;
$A^{11}$ represents a 1,4-phenylene group, a 1,4-cyclohexylene group or a pyrimidine-2,5-diyl group, and said 1,4-phenylene group is either unsubstituted or is substituted with at least one fluorine atom or chlorine atom; and $X^{31}$ and $X^{32}$ each independently represent a hydrogen atom, a fluorine atom, or a chlorine atom.

12. A chiral nematic liquid crystal composition according to claim 11, further comprising at least one compound selected from a group consisting of compounds represented by general formula (III-a) and general formula (V-a):

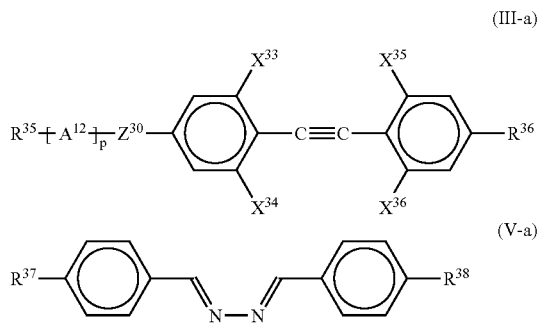

wherein $R^{35}$, $R^{36}$, $R^{37}$ and $R^{38}$ each independently represent an alkyl group having 1 to 10 carbon atoms or an alkenyl group having 2 to 10 carbon atoms, and at least one methylene group within said alkyl group or said alkenyl group may be substituted with either —CO— group, or with oxygen atom or —COO— group, provided oxygen atoms are not bonded together directly;

$Z^{30}$ represents a single bond, or —CO—, —COO—, —OCO— or —CH$_2$CH$_2$—;

$A^{12}$ represents a 1,4-phenylene group or a 1,4-cyclohexylene group, and said 1,4-phenylene group is either unsubstituted or is substituted with at least one fluorine atom, chlorine atom or methyl group;

$X^{33}$, $X^{34}$, $X^{35}$ and $X^{36}$ each independently represent a hydrogen atom, a fluorine atom, a chlorine atom or a methyl group; and p represents either 0 or 1.

13. A chiral nematic liquid crystal composition according to claim 12, wherein in general formula (II-d) and general formula (II-e), $R^{31}$ and $R^{33}$ are each represented, independently, by general formula (II-f):

wherein * represents a position of an asymmetric carbon atom; $R^{39}$ represents an alkyl group having 1 to 6 carbon atoms or an alkenyl group having 2 to 6 carbon atoms;

$M^1$ represents a single bond or an alkylene group having 1 to 3 carbon atoms, and at least one methylene group within said alkylene group may be substituted with either —CO— group, or with oxygen atom or —COO— group, provided oxygen atoms are not bonded together directly.

14. A chiral nematic liquid crystal composition according to claim 12, wherein in general formula (I-b), $R^{30}$ represents an alkenyloxy group having 2 to 6 carbon atoms, and $A^{10}$ represents a 1,4-phenylene group.

15. A chiral nematic liquid crystal composition according to claim 12, wherein the combined total amount of compounds represented by general formula (IV-a), general formula (III-a) and general formula (V-a) comprises 50 to 80% by weight of the composition.

16. A chiral nematic liquid crystal composition according to claim 12, wherein in general formula (III-a), a proportion of compounds in which said group $R^{34}$ represents either an alkyl group having 2 to 3 carbon atoms or an alkenyl group having 2 to 3 carbon atoms comprises at least 70% by weight of all compounds represented by general formula (III-a).

17. A chiral nematic liquid crystal composition according to claim 1, wherein a natural pitch at 25° C. is within a range from 0.1 to 3 μm, and a parameter $\Delta W_{0-50}$ is no more than 0.05, the parameter $\Delta W_{0-50}$ being defined by the formula below, and represents temperature dependency of wavelength selective reflection:

$$\Delta W_{0-50} = \left| \frac{2(\lambda_{50} - \lambda_0)}{\lambda_{50} + \lambda_0} \times \frac{100}{50} \right|$$

wherein $\lambda_0$ represents a wavelength selective reflection in nm at 0° C., and $\lambda_{50}$ represents a wavelength selective reflection in nm at 50° C.

18. A bistable liquid crystal display element, which uses a chiral nematic liquid crystal composition according to claim 1.

19. A chiral nematic liquid crystal composition according to claim 1, wherein the natural pitch of the chiral nematic liquid crystal composition at 25° C. is within the range from 0.2 to 1 μm.

* * * * *